US007062463B2

(12) United States Patent
Knapp

(10) Patent No.: US 7,062,463 B2
(45) Date of Patent: Jun. 13, 2006

(54) SYSTEM AND METHOD FOR ENHANCING FINANCIAL INSTITUTION REVENUES THROUGH ACCELERATION OF DEBIT PROCESSING

(75) Inventor: William Stephen Knapp, 525 Lucern Rd., Cayucos, CA (US) 93430

(73) Assignee: William Stephen Knapp, CA (US)

( * ) Notice: Subject to any disclaimer, the term of this patent is extended or adjusted under 35 U.S.C. 154(b) by 219 days.

(21) Appl. No.: 10/402,218

(22) Filed: Mar. 31, 2003

(65) Prior Publication Data

US 2004/0193537 A1 Sep. 30, 2004

(51) Int. Cl.
*G06F 17/60* (2006.01)
(52) U.S. Cl. .......................................... 705/39; 705/40
(58) Field of Classification Search ................. 705/30, 705/35, 39, 40
See application file for complete search history.

(56) References Cited

U.S. PATENT DOCUMENTS

| | | | |
|---|---|---|---|
| 4,617,457 A | 10/1986 | Granzow et al. | |
| 4,743,743 A | 5/1988 | Fukatsu | |
| 4,810,866 A | 3/1989 | Lord, Jr. | |
| 4,933,536 A | 6/1990 | Lindemann et al. | |
| 5,484,988 A | 1/1996 | Hills et al. | |
| 5,532,464 A | 7/1996 | Josephson et al. | |
| 5,783,808 A | 7/1998 | Josephson | |
| 6,038,552 A | 3/2000 | Fleischl et al. | |
| 6,304,860 B1 | 10/2001 | Martin, Jr. et al. | |
| 6,408,284 B1 | 6/2002 | Hilt et al. | |
| 2002/0042751 A1* | 4/2002 | Sarmo | 705/26 |
| 2002/0046143 A1* | 4/2002 | Eder | 705/36 |
| 2002/0198835 A1* | 12/2002 | Watson | 705/40 |
| 2003/0033245 A1* | 2/2003 | Kahr | 705/39 |
| 2003/0172013 A1* | 9/2003 | Block et al. | 705/33 |
| 2003/0233299 A1* | 12/2003 | Davis et al. | 705/35 |
| 2004/0153400 A1* | 8/2004 | Burke | 705/39 |

OTHER PUBLICATIONS

A New Approach to Covering Overdrafts, Bank Director Second Quarter 2002, [retrieved Nov. 21, 2002] at http://www.lexis.com/research/retrieve?_m=5bef5ce2bec346d4cf58ed600cfc78c2&.docnu. . . , 5 pages.

Devlin, J., BankingSpecial Issue: Check Processing: The need for Speed, [retrieved Nov. 21, 2002] at http://www.armadillosoft.com/articles/banks/index.php?newTopic=11speed, 2 pages.

Atlas, Riva D. Checking is Free, but the Profits are Hefty, The New York Times [online], Nov. 12, 2002, [retrieved Nov. 13, 2002] at http://www.nytimes.com/2002/11/12/business/12FREE.html?pagewanted=print&position . . . , 3 pages.

(Continued)

*Primary Examiner*—Hani M. Kazimi
*Assistant Examiner*—Thu Thao Havan
(74) *Attorney, Agent, or Firm*—Sterne, Kessler, Goldstein & Fox P.L.L.C.

(57) ABSTRACT

A system and method for enhancing financial institution revenue through acceleration of debit processing are provided. The method includes modeling the processing of account debit transactions, identifying ways to accelerate the processing of the account debit transactions and accelerating the account debit transactions. In a further embodiment, account debit transaction processing is accelerated from beginning on what has traditionally been referred to as Day 0 to beginning on some day before Day 0. Finally, a method and system are provided to determine the impacts of accelerating the processing of account debit transactions.

55 Claims, 10 Drawing Sheets

OTHER PUBLICATIONS

*Compass Bank and Compass Bancshares, Inc. v. Jucretia Snow et al.*, 823 So. 2d 667, Dec. 28, 2001 (release date), 14 pages.

Electronic Checks Coming to Town, ABA Bankers News, Jul. 23, 2002, [retrieved Nov. 21, 2002] at http://www.lexis.com/research/retrieve?_m=5f7c306c725ac9f985eb04cf6aca1dee&docnu, 2 pages.

Endpoint: The National Check Image Exchange, Bankers News, Jun., 2002, [retrieved Nov. 21, 2002] at http://www.lexis.com/research/retrieve?_m=5f7c306c725ac9f985eb04cf6aca1dee&docnu . . . , 5 pages.

Gerdes, Geoffrey R. et al., "The Use of Checks and Other Noncash Payment Instruments in the United States," Federal Reserve Bulletin, Aug. 2002, pp. 360-374.

ECP 101: The Basics, ECCHO and Carreker-Antinori, Inc., 1998, 38 pages.

Hill v. St. Paul Federal Bank for Savings, 329 Ill. App. 3d 705, Mar. 29, 2002, 5 pages.

ECP Benefit Report, Nov. 1998, 24 pages.

US 6,331,134, 12/2001, Sachan et al. (withdrawn)

* cited by examiner

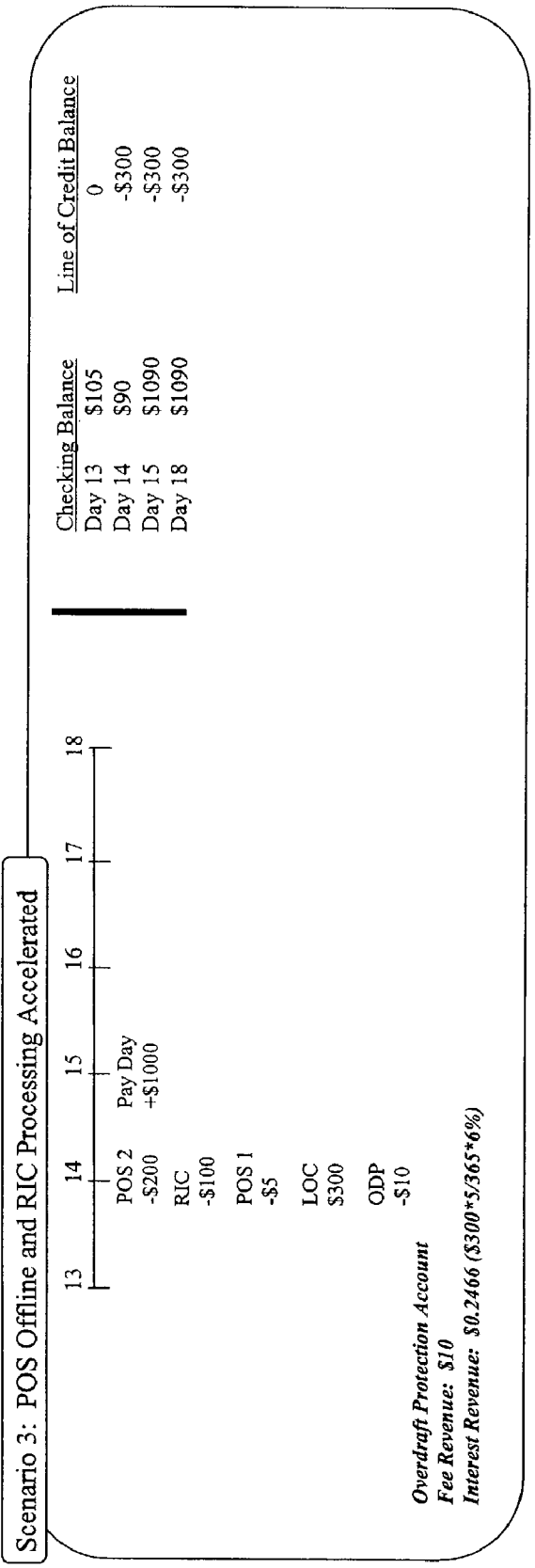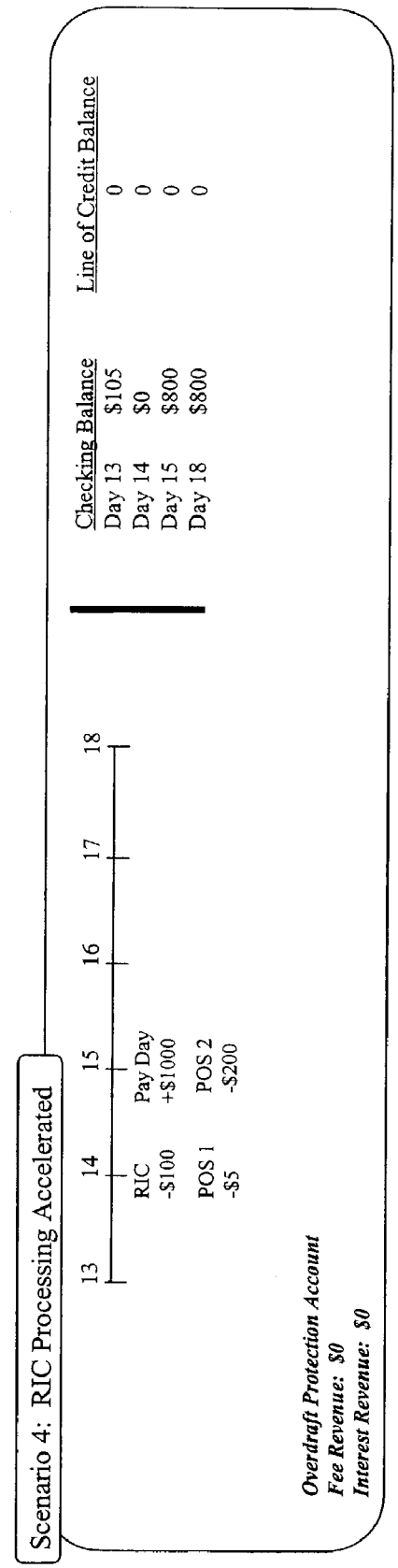
FIG. 1C
FIG. 1D

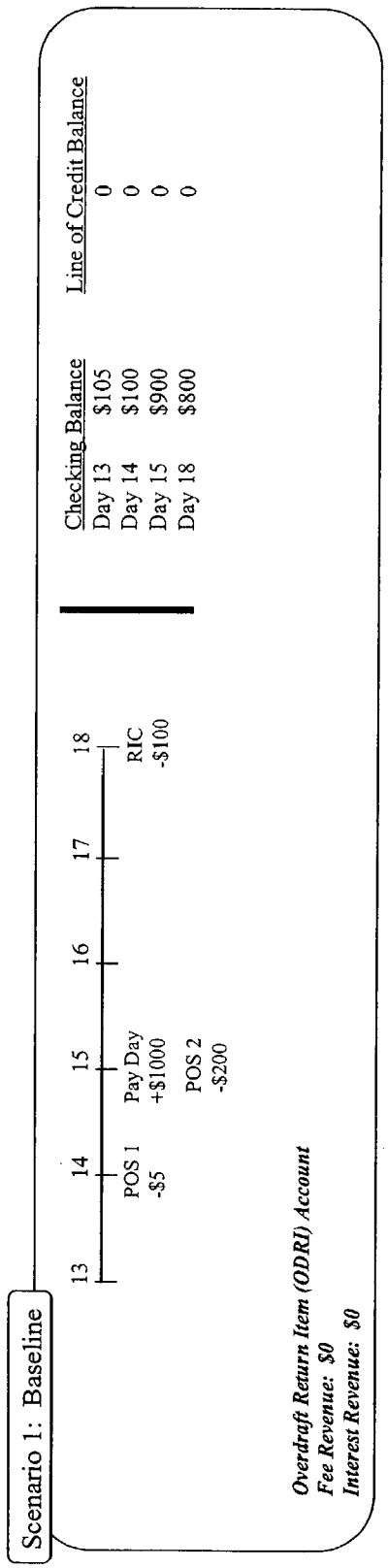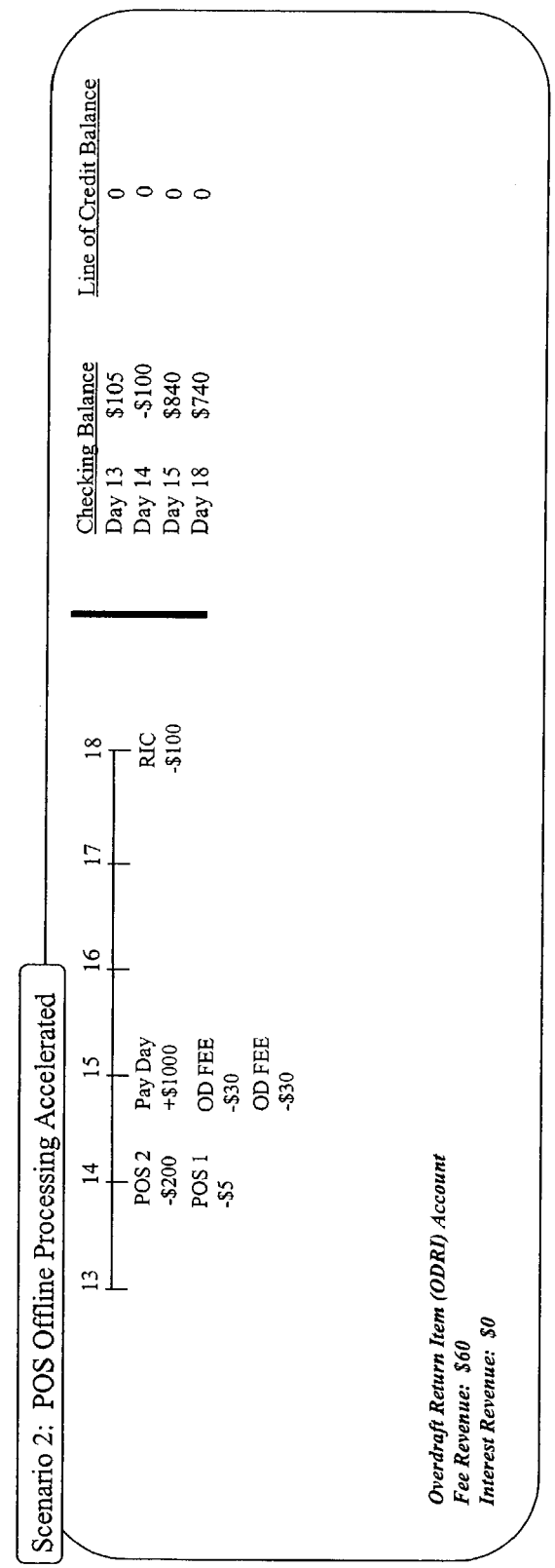
FIG. 2A
FIG. 2B

SYSTEM AND METHOD FOR ENHANCING FINANCIAL INSTITUTION REVENUES THROUGH ACCELERATION OF DEBIT PROCESSING

BACKGROUND OF THE INVENTION

1. Field of the Invention

The invention relates to financial institution operating procedures, and more particularly, to accelerating the processing of debit transactions.

2. Background of the Invention

Debit transaction processing refers to the processing of a financial transaction by a financial institution, such as a bank. In the transaction an entity authorizes the financial institution to debit an account that contains money belonging to the entity, but held by the financial institution. The financial institution may hold the monies in a checking, savings or other type of customer account. Alternatively, in a transaction an entity may authorize a financial institution to charge a credit account which the entity is liable to repay. Such transactions are commonplace in today's society and form the backbone of our economic system. Each day trillions of dollars worth of debit transactions are processed within the United States.

In the traditional banking business model for customer accounts, a bank tried to maximize the amount of money in the bank based on the view that the more money in the bank, the greater the bank's interest revenues. In this view, accelerating the processing of debit transactions would tend to diminish the amount of money in the bank and therefore diminish revenues and profits. Changes in banking technology, regulation, and economic conditions allow this model to be challenged and refined. Banks have merged, thereby, increasing individual bank size and market share. Interest rates and the cost of funds are low. As a result, bank fee revenues have become increasingly important, compared to interest revenues, in the generation of profits.

Debit transactions may either be customer-initiated or bank-initiated. Debit type as used herein refers to a type of debit posted to a customer account. Examples include a point of sale (POS) debit, a check debit, and an overdraft fee debit. Examples of customer-initiated debit transactions include POS transactions, automatic teller machine (ATM) withdrawals, and paper checks.

Bank-initiated debit transactions may be either service transaction fees or account maintenance fees. Service transaction fees are fees directly associated with a particular type of customer-initiated debit transaction, such as an ATM fee that is charged to the customer's account when an ATM withdrawal is made. Account maintenance fees are fees associated with customer-initiated debit transactions, and often triggered by them. Account maintenance fees can be either customer transaction driven or cycle driven. Account maintenance fees that are cycle driven are debited from a customer account at the end of the banking cycle, which is often a monthly cycle at which time a customer receives a monthly statement. An example of this type of fee is a fee for an account balance dropping below a minimum requirement. Account maintenance fees that are customer transaction driven are fees directly associated with customer-initiated debit transactions, and often triggered by them. These are fees that can be imposed prior to the end of the banking cycle. An example of this type of fee is an overdraft fee imposed when an account balance drops below zero.

Numerous methods and devices exist for processing debit transactions. For example, U.S. Pat. No. 4,933,536 to Lindemann et al., describes a check processing device which is used together with a POS terminal. U.S. Pat. No. 4,810,866 to Lloyd, Jr., describes a check validation system located with a POS system for imprinting and otherwise handling a check. Other examples include U.S. Pat. No. 4,743,743 to Fuakatsu which describes an apparatus where a check is examined by a reader at a POS terminal. Other systems for processing checks have also been the subject of invention. U.S. Pat. No. 4,617,457, for example, addresses an ATM form of cashing checks. These patents focus largely on the problem of how to accept checks and to prevent fraudulent activity.

U.S. Pat. No. 5,484,988 to Hills et al, addresses a further aspect of check transaction processing, in that, the patent relates to a checkwriting POS system that integrates with the automated clearing house (ACH) process, primarily to enable greater flexibility as to the types of purchases that may be made and to eliminate the need for paper checks.

Another category of systems dealing with transaction processing involves electronic check processing (ECP). ECP provides a mechanism for financial institutions to computerize check data at the bank of first deposit (BoFD) and send the electronic representation of the check to the payor's bank at least one business day ahead of the paper check. Because the electronic representation of the paper check arrives before the actual paper check, the posting of the debit can occur prior to bank-to-bank settlement, which is triggered by the presentment of the paper check. ECP applies when the BoFD is not the payor's bank which posts the customer's debit.

A number of U.S. patents and a significant number of industry publications address ECP. For example, U.S. Pat. No. 5,532,464 to Josephson et al., and U.S. Pat. No. 5,783,808 to Josephson et al., address systems to handle various aspects of handling paper checks to convert them to electronic information and manage the delivery of the paper checks in an ECP environment.

Still other devices and systems address other aspects of transaction processing. One such category of devices and systems adds functionality to electronic payment schemes, and makes use of credit and debit cards easier. For example, U.S. Pat. No. 6,408,284 to Hilt, et al., describes an electronic bill payment system that enables consumers to send messages via the Internet directing financial institutions to pay a biller's bill. Similarly, U.S. Pat. No. 6,038,552 to Fleischl et al., describes a method and apparatus to process combined credit and debit card transactions.

Additionally, other methods for transaction processing are disclosed in court cases. See e.g., *Compass Bank and Compass Bancshares v. Jucretia Snow* et al., 823 So. 2d 667 (Ala. 2001). In these cases banks altered the order in which checks and other debit items presented on a given day are posted to the customer's account. In particular, the banks posted the debit items from largest to smallest, so that more bank-initiated fees would be incurred.

All the above patents and practices deal generally with transaction processing. However, none deals with the issue of accelerating debit transactions relative to credit transactions in a customer account, irrespective of any settlement or settlement date. Furthermore, none deals with accelerating the posting of any type of debit transaction across any business day or number of days. As a result, because the processing of debit transactions has not been optimized, financial institutions may be losing significant revenues that would accrue from accelerated debit transaction processing.

Unfortunately, the determination of the benefits of acceleration of debit transactions is complex and misunderstood.

This, in fact, may be why more attention has not been given to this problem. To determine the impacts of accelerating debit transactions, many variables and factors must be considered. These include customer reactions, regulatory limitations, implementation costs and prioritization considerations. The interplay of these factors and industry misconceptions (e.g., related to what day processing of a debit transaction can actually begin) make the task of analyzing the impacts of accelerating debit transactions difficult.

What is needed is a method for increasing financial institution revenues through the acceleration of posting debits to a customer account, relative to the credit transactions in that account and irrespective of any settlement or settlement date.

What is also needed is a method and system to determine and measure the financial impacts of such acceleration.

SUMMARY OF THE INVENTION

The present invention is directed to a system and method for enhancing financial institution revenue through acceleration of debit processing. The acceleration of debit transaction processing often leads to the generation of additional bank-initiated service and account maintenance fees, thereby potentially increasing bank revenues. The method includes selecting a customer account type to be examined, selecting a debit type to be examined, mapping the debit transaction processing, identifying processing intervals that can be reduced and determining a revenue impact that can result from acceleration. In a further feature of the invention, an acceleration technique is implemented to achieve the potential revenue gains. In another feature of the invention, the above methods are repeated for all customer account types and for all debit types.

In one embodiment, debit transaction processing is accelerated from beginning on what has traditionally been referred to as Day 0 to beginning on some day prior to Day 0. In another embodiment, debit transaction processing is accelerated by adjusting cut-off times for processing transactions to facilitate earlier posting of debits to customer accounts.

Additionally, a method and system are provided to determine the impacts of accelerating debit transaction processing. The system includes a number of engines including a baseline engine, an accelerator engine, a customer impact engine, a regulatory limitation engine, a prioritization engine and a cost limitations engine. Working together and using various databases to streamline use, the system enables a user to understand the revenue impacts of accelerating debit transaction processing.

Use of the invention provides significant benefits. First, use of the invention can generate significant additional revenues to financial institutions. For example, by accelerating the processing of customer-initiated debit transactions, a financial institution can generate additional bank-initiated account maintenance fees resulting from a greater number of account overdrafts and/or account balances that drop below a minimum balance requirement.

Second, while the potential revenue increases from accelerating debit transaction processing are high, they are not easily understood. Existing financial institution processes demonstrate this point in that these processes currently include unnecessary and readily addressable delays in the processing of debit transactions. In fact, the potential benefits of accelerating the processing of debit transactions are misunderstood. For example, historically, banks have not focused on acceleration of debit transactions relative to customer credits. A number of other factors related to Byzantine regulatory requirements and perceptions regarding the cost to implement changes relative to the potential benefits, impede gaining an accurate understanding of the impacts of accelerating the processing of debit transactions.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

FIGS. 1A–1D are diagrams of scenarios for accelerated debit processing within an overdraft protection (ODP) account, according to an embodiment of the invention.

FIGS. 2A–2D are diagrams of scenarios for accelerated debit processing within an overdraft return item (ODRI) account, according to an embodiment of the invention.

DETAILED DESCRIPTION OF THE INVENTION

Figure 1A:
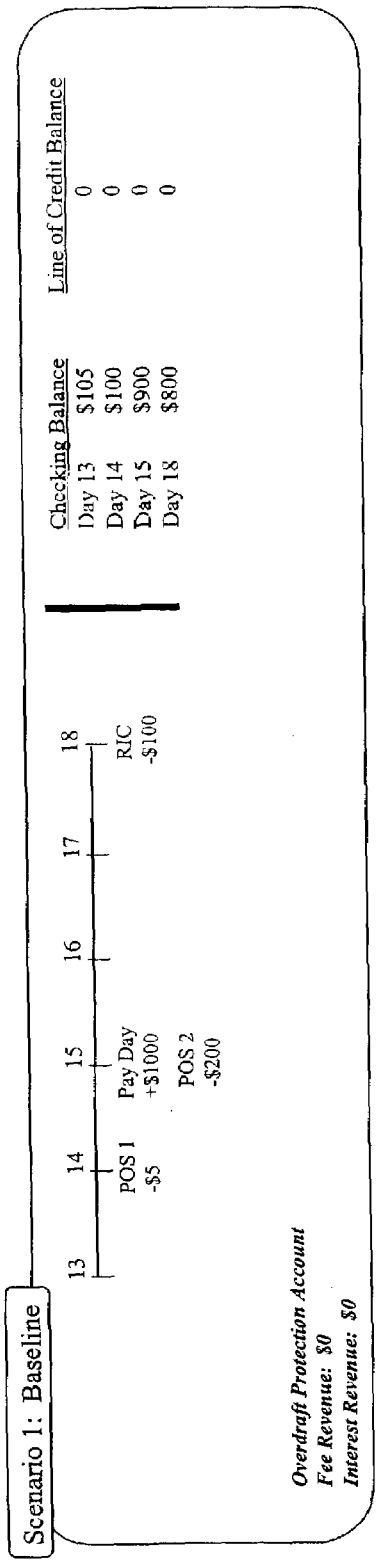

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Throughout the detailed description of the invention for ease of discussion the term bank will be used. The term bank should be interpreted to represent any type of financial institution that holds customer accounts, such as checking, savings, money market, brokerage, credit card and the like.

Acceleration of debit transaction processing provides the opportunity for significant enhancement to bank revenues. FIGS. 1A–1D and 2A–2D provide example transactions in two types of customer accounts: an overdraft protection (ODP) account and an overdraft return item (ODRI) account. The examples demonstrate how incremental revenues can be produced through the acceleration of debits.

FIGS. 1A–1D provide four scenarios for posting debits to an overdraft protection account. In the example, the overdraft protection account is assumed to be a checking account that is linked to a line of credit account. In other examples, the checking account may be linked to a savings account, a credit card account, or other type of account. In the event that an individual overdraws the checking account, the bank will automatically transfer funds at the close of the business day from the line of credit account to the checking account to cover the overdrawn amount. In doing so, the bank will impose an overdraft protection fee. In this example, the checking account does not bear interest. There can be many variations to overdraft protection accounts.

Likewise, FIGS. 2A–2D provide the same four scenarios for posting debits to an overdraft return item (ODRI) account. In this case, if a customer overdraws his account, the bank will charge the customer an overdraft fee for each debit transaction that overdraws the account or occurs when the account is overdrawn. Also, in this example, the checking account does not bear interest. There can be many variations to overdraft return item accounts.

Both FIG. 1 and FIG. 2 provide four scenarios to illustrate the impacts of debit processing acceleration and to demonstrate the different impacts that acceleration has on different account types over a six day period. In each scenario, the time period runs from a Wednesday (represented as the $13^{th}$ of a month) to a Monday (represented as the $18^{th}$ of a month). During this period a customer starts with a positive balance of $105, and receives a credit of $1,000 on the $15^{th}$, representative of a direct deposit of their salary. For most customers, the date of credits for paydays is fixed by their employers, and therefore can not be adjusted. As can be seen from the scenarios, the critical factor driving incremental revenue to the bank is that debits are accelerated relative to the credit activity in that customer's account—in this case the customer's payday.

In the baseline scenarios in both FIG. 1A and FIG. 2A, the customer begins with a checking account balance of $105 and a line of credit account balance of $0. The line of credit account is assumed to incur simple interest at the rate of 6% per year, computed daily and charged monthly, at the end of each month. The checking account is assumed to pay no interest. On Thursday, the $14^{th}$, the customer's account is debited $5 for a POS online transaction (POS 1). On Friday the $15^{th}$, the customer's account is credited $1000, representative of his salary amount. On the same day, a POS offline debit (POS 2) for $200 is posted. On Monday the $18^{th}$, an incoming returned item check debit (RIC) in the amount of $100 posts to the customer's checking account. In the baseline scenarios, the accounts are not overdrawn and the bank receives no revenue from fees nor interest in either case.

Figure 1B:
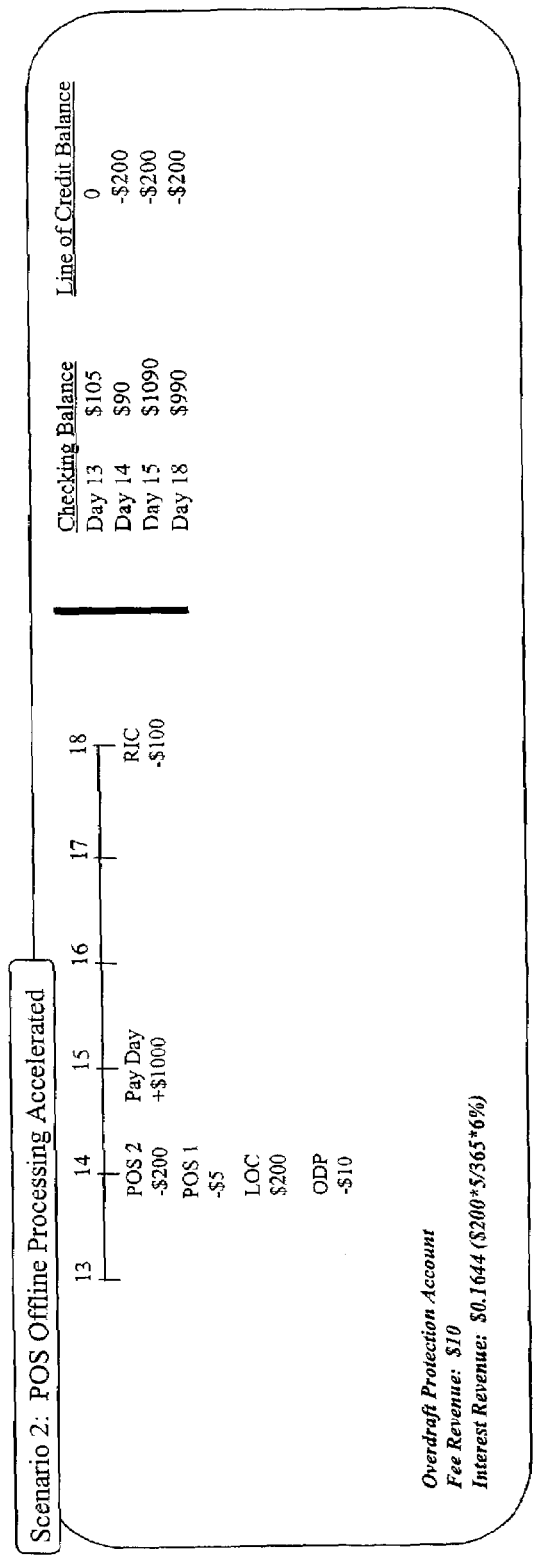

In scenario 2 in both FIG. 1B and FIG. 2B, POS offline processing is accelerated, such that POS 2 now posts on the $14^{th}$ and the checking account becomes overdrawn in both cases. In the case of the overdraft protection account in FIG. 1B, the bank automatically transfers $200 from the line of credit (LOC) account to cover the overdraft and imposes an overdraft protection fee of $10. Thus, the bank has fee revenue of $10 and, as a result of the draw down from the line of credit account, the bank's interest revenue is increased by $0.1644 during the period under study for interest charged to the LOC account. In the case of the overdraft return item account in FIG. 2B, the account becomes overdrawn by $100. The bank imposes an overdraft transaction fee of $30 for each of the debits posted that day. These fees are associated with the accelerated POS offline (POS 2) debit transaction which drove the account into overdraft, and for the $5 POS online (POS 1) debit transaction which posted after it. In this case, the assumption was made that debits will post from highest to lowest. The two overdraft transaction fees post on the next business day, the $15^{th}$. Thus, the bank has fee revenue of $60 and interest revenue remains unchanged since there is no change to the line of credit account balance.

Figure 2C:
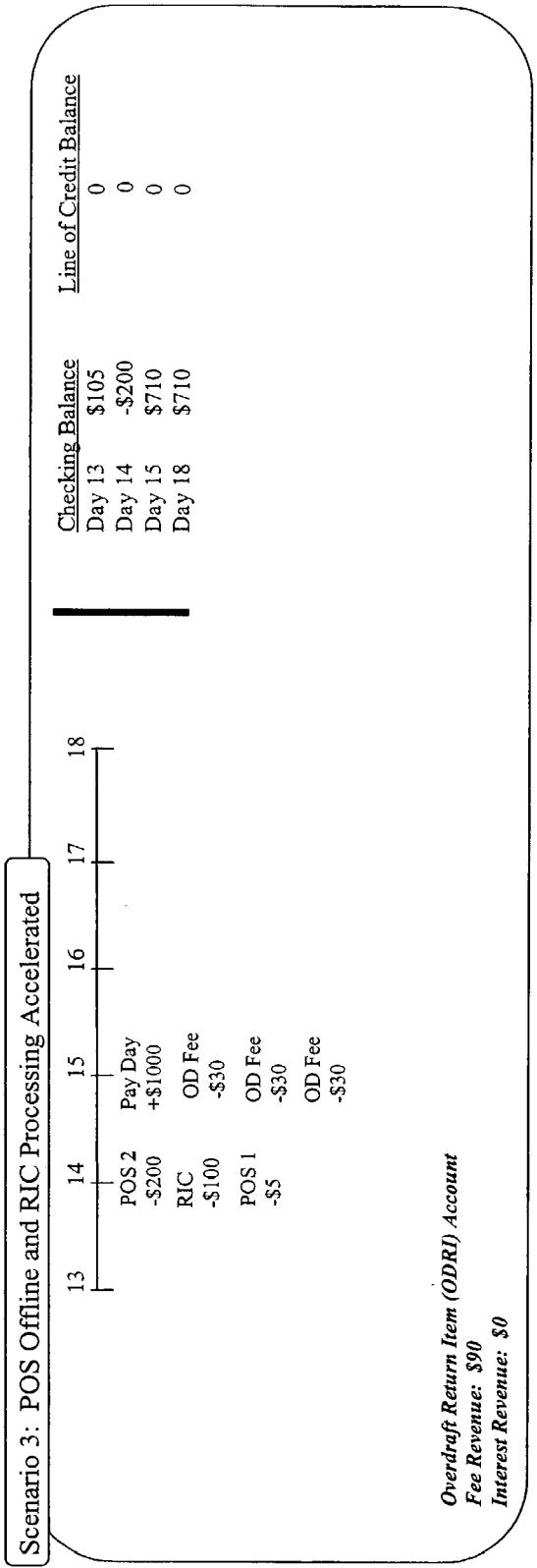

In scenario 3 in both FIG. 1C and FIG. 2C, in addition to POS offline processing being accelerated, returned item check processing is accelerated, such that the RIC now posts on the $14^{th}$ in both cases. In the case of the overdraft protection account in FIG. 1C, the bank automatically transfers $300 from the line of credit account to cover the overdraft and imposes a single overdraft protection fee of $10. Thus, the bank has fee revenue of $10 and, as a result of the draw down from the line of credit account, the bank's interest revenue is increased to $0.2466 during the period under study. In the case of the overdraft return item account in FIG. 2C, the account becomes overdrawn by $200 and the bank imposes three overdraft fees of $30 each, posted the next day on the $15^{th}$, for the three overdraft debits. Thus, the bank has fee revenue of $90 and the interest revenue remains unchanged. FIGS. 1C and 2C highlight a significant distinction in these examples in that the overdraft return item fees are imposed on a per transaction basis, while overdraft protection fees are imposed on a per account per day basis. This difference results in the overdraft return item account generating significantly more incremental revenue than the overdraft protection account.

Figure 2D:
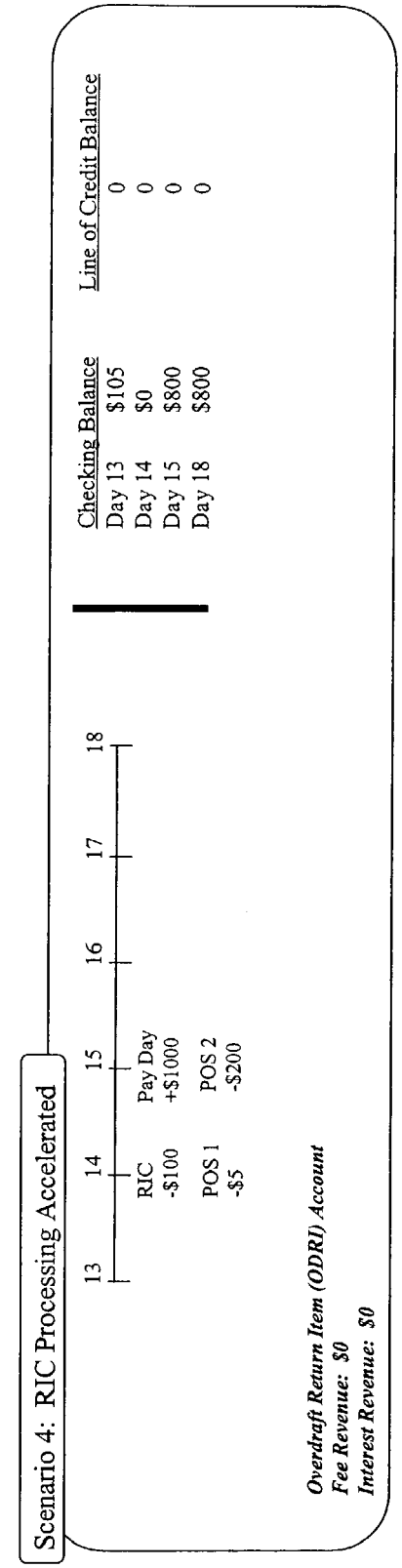

In scenario 4 in both FIG. 1D and FIG. 2D, returned item check processing is accelerated, such that the RIC now posts on the $14^{th}$ instead of the 18th in both cases. Unlike in scenarios 2 and 3, the POS offline debit (POS 2) is not accelerated. In scenario 4 in both FIG. 1D and FIG. 2D, no overdraft is created nor is any incremental revenue created, as compared to the baseline scenarios in FIG. 1A and FIG. 2A, which illustrates that not every instance of debit processing acceleration will increase revenues.

A comparison of scenario 4 with scenario 2, shows that revenues are created in scenario 2 but not in scenario 4. The accelerated debit, posting on the $14^{th}$, is $200 in scenario 2 rather than $100, as in scenario 4, which demonstrates that incremental revenues can be affected by the amount accelerated. Comparing scenario 4 to scenario 3 demonstrates that the difference in revenues is created by the posting date of POS 2. Furthermore, accelerating the POS 2 posting from the $15^{th}$ to the $14^{th}$ has the same size, but opposite value effect, on revenue as delaying the POS 2 posting from the $14^{th}$ to the $15^{th}$, which illustrates that the elimination of delay in debit posting is as valuable as acceleration.

The scenarios depicted in FIGS. 1A–1D and 2A–2D illustrate a number of points. First, the acceleration of debit transactions relative to the credit activity in customer accounts can increase bank revenue streams, such as ODRI fee revenue, ODP fee revenue and interest revenue.

Second, the type of debit accelerated makes no difference to the incremental revenues which will be generated through acceleration. Any type of debit, including bank-initiated debits, will diminish the account balances, thereby potentially creating incremental revenues. While bank-initiated debits will themselves not directly attract transaction fees, their acceleration will increase the likelihood of creating more revenue on the next day.

Third, acceleration across more than one day will likely increase revenues more than acceleration across one day. In FIG. 1C and FIG. 2C, the returned item check was accelerated from Monday the $18^{th}$ to Thursday the $14^{th}$, across two business days and across four calendar days and led to additional bank revenues. If the returned item check had been accelerated only one business day to Friday $15^{th}$, there would have been no incremental revenue effect generated, compared to FIGS. 1B and 2B.

Fourth, a more significant portion of the revenue increase will likely result from fee revenue, rather than from interest revenue (or interest expense reduction if a savings account served as the linked account.)

Fifth, the amount of the revenue increase will be a function of the type of customer account affected and the revenue streams relevant to that account type. Interest revenue will be affected by the amount of the accelerated debits and the calendar days by which the debit was accelerated. ODRI incremental fee revenue will be affected by the number and amounts of the debits accelerated across business posting days. Higher amounts will drive more accelerated and non-accelerated debits into overdraft. ODP incremental fee revenue will be affected by the additional number of accounts driven into overdraft, and ODP incremental interest revenue will be affected by the amount of the debits accelerated to those accounts. In general, incremental fee revenue depends upon debit acceleration across business posting days, whereas incremental interest revenue depends upon debit acceleration across calendar days.

Sixth, acceleration of debits across any day or number of days has the same revenue value as elimination of delay in posting debits. Acceleration and delay elimination have the same, but opposite revenue effect as de-acceleration, delay or retardation of posting. Each day across which a debit posting is accelerated is equally valuable, and several days are more valuable than one, irrespective of where the debit is in the processing cycle. In the scenarios illustrated in FIGS. 1A–1D, and 2A–2D, POS 2 may post on the same day it was received by the posting bank, say the $14^{th}$, or on the day after, on the $15^{th}$. These may be logical Day 0 and logical Day 1 in processing terms. But the returned item check on the $18^{th}$, may be at logical Day 6 in the processing cycle associated with its processing, having first been deposited at the bank on the $8^{th}$(Day 0). The acceleration of the RIC posting from the $18^{th}$ to the $14^{th}$ could be acceleration from logical Day 6 to logical Day 4 in the processing cycle. Acceleration across any logical processing day is as valuable as acceleration across any other logical day, so acceleration from Day 6 to Day 5 is as valuable as from Day 3 to Day 2 or from Day 0 to Day −1.

Seventh, the incremental revenues to the account type revenue streams are irrespective of any settlement activity concerning the accelerated debits. It does not matter whether acceleration is before or after settlement nor whether there is any settlement at all. If POS 2 were deposited by a depositor whose account is in the same bank as the customer whose account is being debited for the POS transaction (i.e., if the bank of first deposit (BoFD) is the same bank as the Payor Bank), there is no bank-to-bank settlement, and no money leaves the bank. For the returned item check, either there was no settlement or if settlement did occur, that settlement would be reversed by the $18^{th}$. Where settlement becomes relevant is in consideration of the particular method of acceleration to be used. If the method of acceleration of debit posting also accelerates settlement of monies out of the bank, then that also needs to be factored into an analysis to determine the net revenue benefit to the bank.

Figure 3:
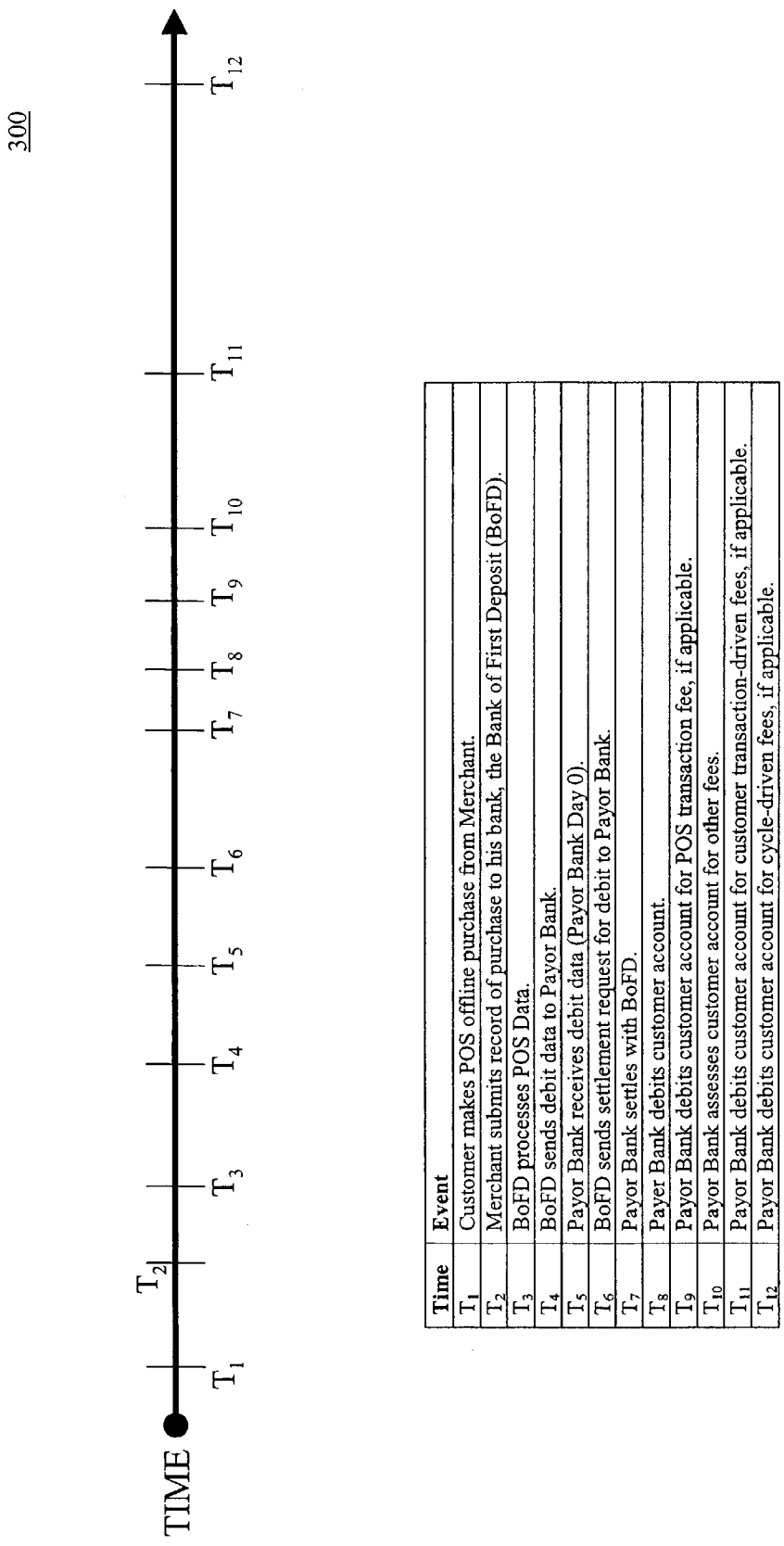
FIG. 3 is a diagram of a mapping of the processing of an offline POS transaction, according to an embodiment of the invention.

Referring to FIG. 3, timeline 300 represents a debit type transaction processing model. The model depicts the time of the major events in the processing of one type of debit transaction. In this example, the debit transaction that is depicted is a POS offline transaction in which a bank customer makes a purchase from a merchant who uses a different bank (the Bank of First Deposit or 'BoFD' or Payee Bank) than the bank of the customer (the Payor Bank). For illustration purposes, the model is a concatenation of a primary transaction, the POS offline transaction, and several secondary debit transactions that can be triggered as a result of the POS transaction. As discussed more fully infra, there can be many potential scenarios for processing a debit transaction. FIG. 3 is provided to illustrate the mapping process of a debit transaction and is not intended to provide a definitive way to process POS offline debit transactions.

The time from T1 to T8 represents processing of the primary transaction, which in this case is an offline POS transaction. The process begins at time T1, when the customer makes a POS purchase from a merchant. At this time the customer makes a commitment, possibly by signing a paper receipt, which allows the merchant to request funds from the customer's bank account. The next point in the process is T2, which is when the merchant presents a POS record to the merchant's bank, BoFD, for processing. At time T3, BoFD records the transaction and begins processing the transaction. At time T4, BoFD sends the debit data to the Payor Bank. At time T5, the Payor Bank receives the customer account debit data. This is the first time that the customer's bank, the Payor Bank, knows about the debit and is typically referred to by the Payor Bank as Day 0. At time T6, BoFD requests payment in settlement from the Payor Bank which maintains the customer account and at time T7 the Payor Bank sends the settlement payment.

At time T8 the Payor Bank debits the customer's account for the amount of the POS transaction. This is referred to as posting of the debit transaction. Posting can be considered the final step of interest in the processing of a debit transaction for the purpose of the invention, as long as the posting is not reversed and the item 'unposted' and returned to the BoFD.

The time from T9 to T12 represents a model for processing of secondary bank-initiated debit transactions that can be associated with the primary transaction. As discussed previously these fees include: service transaction fees; customer transaction-driven, account maintenance fees; and cycle-driven, account maintenance fees.

Each of the secondary transactions would have a separate model. For ease of illustration, however, not all secondary transactions are shown here. Rather, times T9 to T12 are provided to depict general categories of secondary transactions that can occur. The time from T8 to T9 represents the model for the processing of any bank-initiated service transaction fee directly associated with the POS transaction. For example, in the case of a POS transaction this time period would be the time to determine whether a POS transaction fee applied, and if one did, posting it to the customer account.

At time T10, the customer bank assesses whether any bank-initiated account maintenance fees that are related to the transaction, should be debited from the customer account. Customer transaction-driven fees, such as an overdraft fee, can be imposed relatively soon after the completion of the primary transaction, as is depicted by time T11. Usually they are imposed on the same day as the posting of the debit transaction that triggered the fee as with the ODP fee, or on the next day as with ODRI fees. Cycle driven, account maintenance fees such as a minimum balance or other service fee, are imposed at the end of the banking cycle, typically a monthly cycle, for the particular customer. This is depicted by time T12 in the timeline.

There are several other points on the timeline that are of particular importance. The first important time is time T5. T5 is Day 0 for this particular transaction from the perspective of the Payor bank. Day 0 is the date that a bank defines as the first day in which transaction processing can begin. The other important time period is T6 through T7, which relates to the bank-to-bank settlement period.

Figure 4A:
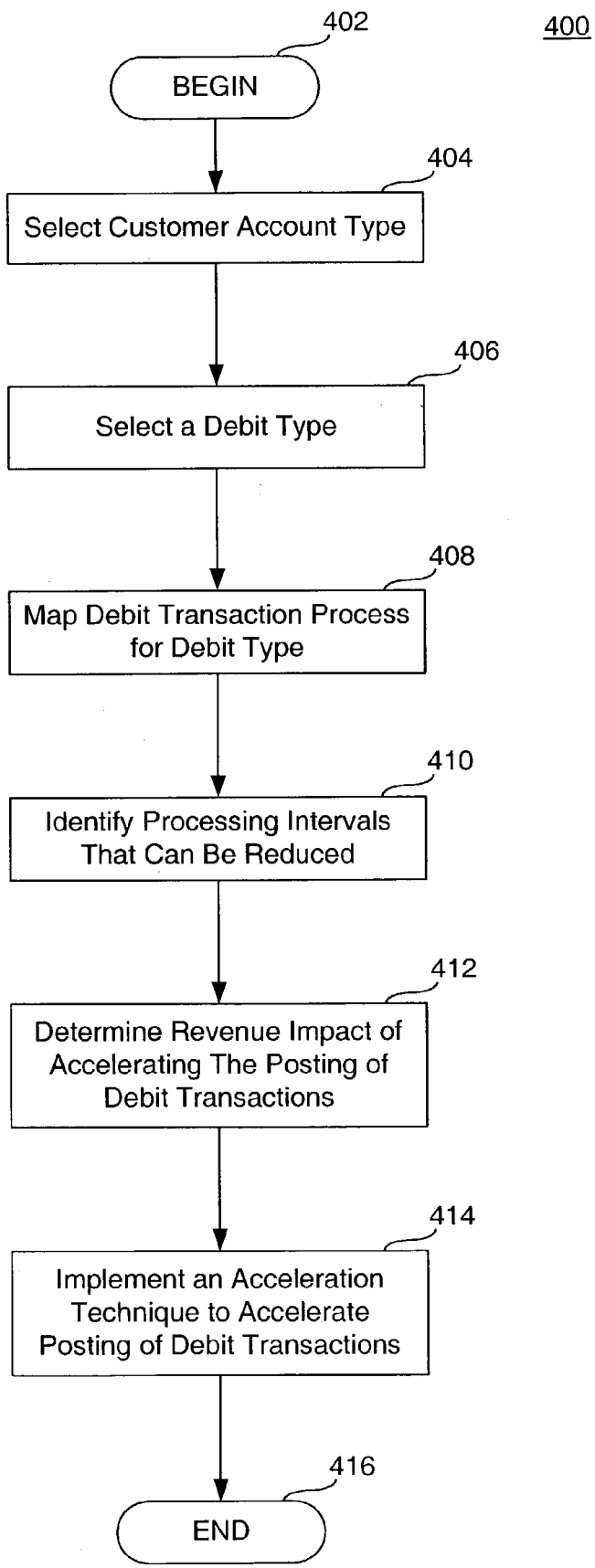
FIG. 4A is a flow chart of a method for increasing financial institution revenue, according to an embodiment of the invention.
Figure 4B:
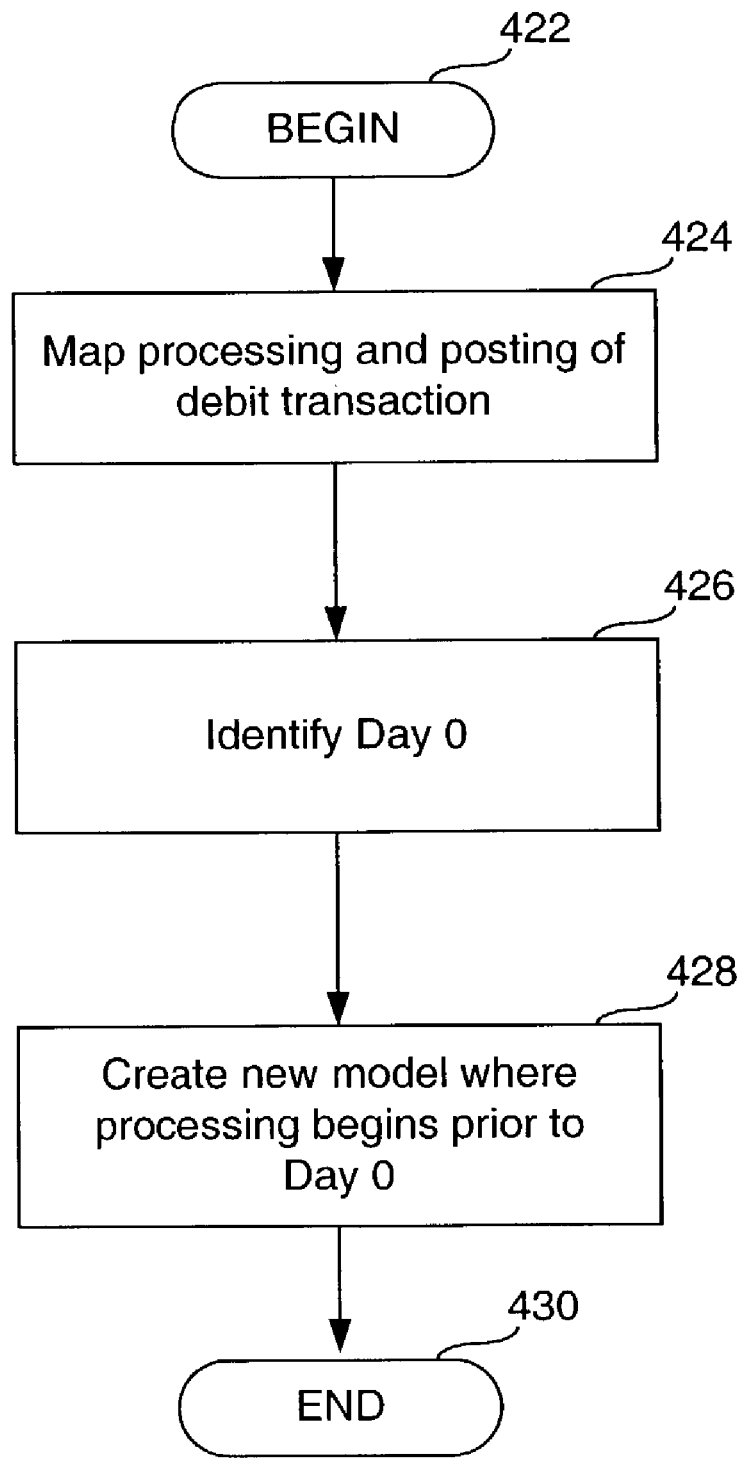
FIG. 4B is a flow chart of a method for increasing financial institution revenue, according to an embodiment of the invention.

The process illustrated in the flow charts of FIGS. 4A and 4B provides a method for increasing financial institution revenue, according to an embodiment of the present invention. Method 400 begins in step 402. In step 404, a customer account type is identified that will yield increased revenue when processing and posting of a debit type is accelerated relative to the credits in those accounts.

Customer account types can be organized in a number of ways. One method includes organizing accounts into retail customer, commercial, and middle market accounts. Retail customer accounts are accounts associated with individuals. Whereas, commercial and middle market accounts are those associated with businesses. Commercial and middle market accounts are often referred to as analyzed accounts, when they are individually analyzed for profitability.

Retail customer accounts can be categorized as interest accounts or those subject to account maintenance fees that can be affected by debit acceleration. An interest bearing account generates interest income for a customer and generates interest expenses to the bank. Of course, the bank's interest expense to the customer, is less than the revenue that the bank can realize from the deposited monies. Examples of interest bearing account types include, but are not limited to, savings, interest checking, market rate, money market, and time deposit accounts. An interest revenue account generates interest expenses for a customer and generates interest revenue to the bank. Examples of interest revenue account types include, but are not limited to, credit card and line of credit accounts. Examples of retail customer accounts that are subject to account maintenance fees include, but are not limited to, overdraft protection and overdraft return item accounts as described relative to FIGS. 1A–1D and FIGS. 2A–2D.

In selecting a customer account type to be considered, the most important factor is to select a customer account type in which debit processing acceleration will increase fee revenue, interest revenue, or both. Examples of specific customer account types that meet this criterion include analyzed accounts liable to overdraft charges, analyzed accounts that are subject to service fees, overdraft protection (ODP) accounts, overdraft return item (ODRI) accounts and all types of interest accounts.

For each of these account types, approaches can be developed to predict the incremental fee and interest revenues that can result from acceleration of debit posting to these account types. Example approaches for analyzed overdraft accounts, overdraft protection (ODP) accounts, analyzed accounts subject to service fees, interest accounts, and overdraft return item (ODRI) accounts are provided below.

In one type of analyzed overdraft account, a bank permits a customer to overdraw its account. When an overdraft occurs, the bank imposes a fee and charges interest on the amount that the account has been overdrawn. In this example, the primary incremental revenue stream to a bank that may be realized as a result of acceleration of debit processing is equal to the sum of the incremental fee and interest revenue. Specifically, the incremental revenue will be given by the sum of these two components as depicted in equation (1):

$$(N*F)+((\$*0.50)*D*I) \tag{1}$$

Where,

N is the number of accounts driven into an overdraft position as a result of debit acceleration, F is the dollar value of the daily account fee imposed on an account for being in overdraft, $ is the total dollar amount of debits accelerated to accounts that were driven into overdraft, D is the average number of calendar days that accounts are in an overdraft position, and I is the interest rate applied for one calendar day.

The use of equation (1) to predict potential incremental revenue requires that certain factors be estimated. The factors to be estimated include D, N, and $. D can be estimated as the number of calendar days in a year (365) divided by the number of business days in a year (251) times the reciprocal of the percentage of customers that cover their overdrafts within the next business day (i.e., (365/251)*1/percentage of customers covering their overdrafts within one business day). A banking institution can provide estimates of the percentage of customers covering their overdrafts. Typically, for commercial accounts this percentage is approximately 90%.

To determine estimates of N and $, the following approach can be used. In the first step, determine the median dollar amount (M1) of the debits, within the debit type of be accelerated, that are posted to analyzed accounts in overdraft (OD) status before implementation of any acceleration means. Next, a determination is made of the number of accounts (C1) in the account type under consideration (i.e. all analyzed accounts liable to overdraft charges) with positive balances that are less than M1 and which have that debit type activity. Next, a determination is made of the number of accounts (C2) in the account type with negative balances that are smaller than amount −M1, and which have that debit type activity. Finally, determine the mean total dollar amount (M2) of the debits, of the debit type to be accelerated, which are posted to accounts that are included within C1 and C2. Then, N and $ are approximated by:

$$N=C1-C2 \tag{2}$$

$$\$=M2*N \tag{3}$$

Incremental ODP revenue created by debit acceleration can be predicted by using a similar method to the predictive calculations for analyzed OD fee and interest revenue. A difference will be created, however, by the fact that ODP customers will generate no overdraft that they need to cover. The overdraft will be covered by the protective link to an interest account. Moreover, the great majority of ODP customers will be retail consumers rather than commercial businesses and so their banking practices will be different. The incremental ODP revenue associated with debit acceleration can be approximately predicted by:

$$35\%*F2*N2+\$*I \tag{4}$$

Where,

F2 is the overdraft protection fee charged when the overdraft protection feature is applied, N2 is the number of overdraft protection accounts which are exercising the protection feature (i.e., drawing down funds from the protecting accounts), and which contain the debit type to be accelerated, $ is the incremental amount of the debits drawn down because of acceleration, and I is the interest rate of the linked account type, or a weighted average of the different interest rates of the linked accounts.

In equation (4), $ can be approximated by the following equation:

$$\$ = 50\% * 35\% * A \quad (5)$$

Where,

A is the dollar amount of the debit type in overdraft protection accounts already in an overdraft or drawing down position prior to the acceleration.

Another analyzed accounts example relates to those analyzed accounts that incur service fees for account activity. These fees are often reduced depending on the customer accounts average balance. A bank determines how much of the service fees to waive based on a number of factors, one of which is the interest that a bank might earn on funds on deposit with them. So the incremental revenue resulting from debit acceleration to this account type can be approximated by:

$$50\% * \$ * D * I \quad (6)$$

Where, $ is the dollar value of debits accelerated to analyzed accounts liable to account service fees for account activity, D is the number of calendar days of acceleration, and I is the cost of funds interest rate applied for one calendar day.

In equation (6) the 50% factor is based on analysis of banking policies of the percentages of fees that they are likely to waive. This percent can vary by banking institution, but serves as a good overall estimation of the incremental revenue gain.

With respect to analyzed and non-analyzed accounts, the incremental revenue associated with debit acceleration to accounts that are interest bearing or interest charging can be estimated by the following:

$$\$ * D * I \quad (7)$$

Where, $ is the dollar amount of debits to be accelerated to interest accounts,

D=the average number of calendar days of the acceleration, and

I=the interest rate applied to the account for one calendar day.

While commercial customers tend to cover their overdrafts with credits on the next business day in around 90% of cases, retail customers with accounts liable to ODRI fees do so in only about 50% of cases. This percentage varies by day of week and week of the month and, of course, paydays. If an account is in OD on the first day but not in OD on the second day, acceleration of debits from the second day to the first will increase revenues substantially. If these accelerated debits posted last, they would usually each incur a fee. If they are sorted high to low with the other first day debits, the accelerated debits may be taken out of overdraft themselves but drive more smaller debits into overdraft.

Since the debits accelerated to the first day are now, in effect, sorted above all the remaining debits on the second day, it is likely that more of the latter will attract fees. This is made even more likely by the fact that the second day debits are posted after the additional fees generated on the first day. Thus debit acceleration to ODRI accounts creates more fees not only on the posting day but also on subsequent days. This is also true if an account is in OD on both days.

If an account is in OD on the second day but not on the first day, acceleration of debits from the second day to the first day can reduce the number of fees. However, it can also drive the account into OD status on the first day, creating more fees. As has been seen from the examples in FIG. 2, acceleration can drive accounts into OD status, when they are not originally overdrawn on any day. When this happens, only half of the accounts will be taken out of OD the next day. The number of positive balance accounts driven into OD status by acceleration, will vary by the average total amount of the debit type in each account to which they post, but can be 25% to 35% of overdrawn ODRI accounts with accelerated debits.

In general, the increased ODRI revenue to be created by acceleration is approximated by:

$$F3 \times 50\% \times N3 \quad (8)$$

Where

F3 is the ODRI transaction fee, and

N3 is the number of debits, to be accelerated, already found in ODRI accounts in OD status.

This incremental revenue, and the 50% figure, is affected by customer behavior, the number of waived fees and by the ratio of Returned Items (which do not diminish the account balance) to OD items, as well as by any changes in these once acceleration is implemented. If the debit type to be accelerated has 1% of its debits sent to ODRI accounts in OD status, then the incremental revenue per day of accelerating a debit type by one day is approximated by:

$$0.5\% \times F3 \times N4 \quad (9)$$

Where,

N4 is the number of debit type items to be accelerated to the account type, accounts liable to ODRI fees.

The five examples above demonstrate that it is possible to generate predictive approximations of the increased revenues to be created in the revenue streams of specific account types by the acceleration of debits which post to those account types. The revenue streams and the incremental revenues created within them are specific to certain account types, those where revenues can be increased by diminishment of the account balance. Such diminishment can be achieved by acceleration of debits relative to the credit activity in the accounts.

The five examples above are not an exhaustive list. A bank may have other account types whose revenue streams can be increased by diminishment of the account balance. For example, consumer account monthly service fees may be fixed or depend on direct debit, or they can depend on balance but indirectly, or on a minimum balance threshold. Through analysis within the bank, it will be possible to develop an algorithm that expresses the additional minimum balance fees that can be collected by acceleration of debits to that account type. In order to measure the full revenue benefit of debit acceleration, the method requires that all affected account types within the institution be considered. Each individual account may be in more than one affected account type; for example, a savings account can be interest bearing and liable to ODRI, and a checking account can have a minimum balance threshold and ODP.

In step 406, a debit type for consideration is selected. The debit type can be either a customer-initiated debit or a bank-initiated debit. Examples of customer-initiated debits include, but are not limited to, a POS offline debit created by a check card or debit card purchase, a POS online debit created by a check card or debit card purchase, a POS online debit created by a check card advance, a check purchase, a wire withdrawal or transfer, an automatic electronic debit, an Internet debit and an ATM withdrawal. Examples of bank-initiated debits include, but are not limited to a returned item fee, incoming returned item, overdraft transaction fee, and an overdraft protection fee.

Assisting the analysis of different types of debits, banks tend to have different typologies for customer-initiated debits. The typology described above is based on the payment instrument, which is usually visible in a bank's demand deposit accounting computer systems. This typology can be used within the present invention. Such a typology, however, can make precise identification of acceleration opportunities and cost benefit analysis of the impact of debit acceleration difficult because of the many ways a particular debit type can be processed.

For example, in a typology based only on the payment instrument, credit card transactions using a mechanical sliding card imprint device in which a merchant delivers the paper receipt to a bank three days later would be classified the same way as a credit card transaction in which details of the transaction were transmitted electronically at the time of the purchase. Such a classification would make identification of ways to accelerate a process difficult in that the processing characteristics are quite distinct.

Likewise, checks can be processed in many ways with very different transaction processing characteristics that would make analysis based solely on the fact that a check was processed difficult. For example, a check that was delivered to a BoFD on logical Day –2, then spent two days in process by a clearing house or the Federal Reserve, prior to delivery to the posting bank, has very different processing characteristics and acceleration opportunities from those of a check that was received by mail at a third party lockbox processor. An enhanced typology scheme should be able to distinguish between different processing characteristics that affect the timeline and the cost benefit analysis associated with debit transaction processing accelerations.

In an alternative embodiment of the present invention, typologies can be developed to enhance the ease and precision of cost benefit calculations related to the acceleration of a particular debit type. In particular, an enhanced typology can be created based on the following features: (1) the instrument, (2) the source; (3) the channel, (4) the route through which the debit was processed; and (5) the timeline. Source could include such origins as other accounts, other computer systems (loan or security applications), merchant cards, and BoFDs. Channel could include such vehicles as Over The Counter Branch Stores and customer or bank-initiated electronic funds transfer. Route could include the processing institutions between the customer and the posting bank.

A typology which is more specific about processing characteristics allows easier identification of acceleration opportunities. A typology which also shows the BoFD of the credit associated with the debit, will allow consideration of settlement funds in the cost benefit analysis of acceleration of a debit type. So the approach should be able to distinguish a debit in which the posting of the debit and credit associated with the transaction is within the same bank from when they are in different banks. This is important because it shows whether or not money will be sent out of the bank in settlement when the debit is posted. It is important to appreciate that by the 'same' bank, is meant the same institution, rather than the same legal entity. Many of the larger banks have separate legal entities in different States. There may be settlement between the institution's legal entities, but no money is leaving the institution as a whole; they therefore constitute the same bank.

In step 408, debit transaction processing for the selected debit type is mapped. FIG. 3 depicts one example of a timeline that can be created through the mapping process. The key attributes of such a timeline are that it depicts the major transition points, such as communication between the payor, the payee, and the financial institutions involved in the process. Furthermore, the timeline identifies factors influencing the timing of and duration between processing events. A debit type using a simple typology can have many different maps with different routes. As the complexity of the typology scheme increases, a debit type within that typology will have fewer different maps. In either case, analysis should occur for each of these different maps and routes for a particular debit type.

In contrast to conventional wisdom within the banking industry, the timeline used in the mapping should begin at the time of the customer's payment authorization, rather than at what is commonly referred to as Day 0, which is the first day that a bank begins processing the debit. While Day 0 can sometimes be the same as the date of a customer commitment to have monies debited from an account, this is not always the case. Artificially limiting consideration of acceleration of the process to start at Day 0, unnecessarily reduces potential revenue opportunities, since acceleration to the bank is as valuable as acceleration within the banking process.

Furthermore, when mapping the process, the times should not be limited to measurements in terms of days as is often the case, but rather hours and minutes should be recorded. Each debit type can have different daily cut-off times for customer and institutional processing activities. Thus, what constitutes a business day can vary for different debit types. For example, in a situation in which the ACH bank delivery cut-off time is 6 pm and the check delivery cut-off time is midnight, if the BoFD converts a check to ACH after 6 pm, but before it could deliver that check to the posting bank by midnight, then posting of the debit to the customer's account is delayed by one business day. The maps should show the relevant cut-off times as well as the dollar and item count volumes of the debit type at each point of time T. Within steps 404, 406 and 408, the number of debits or the proportion of the debit type to be accelerated to each of the affected account types needs to be established.

In step 410, once a map has been created, the timeline is examined to identify processing intervals that can be reduced. Many alternatives can exist to reduce the processing interval. For example, the debit can be re-typed to a type of debit that reaches the banking system earlier and therefore posts earlier. The debit can be delivered earlier to the BoFD. The progress and velocity of the debit through the banking communication process to the posting bank can be enhanced. The posting bank's processing can be enhanced.

For example, for the POS transaction depicted in FIG. 3, time periods from T1 to T8 would be examined to determine what processing, if any, could be accelerated. An examination might indicate that the period from T1 to T3, which is the time it takes before the BoFD processes a POS receipt from a merchant, can be reduced. As one possibility, some POS offline transactions could be converted to POS online transactions to exploit the difference in cut-off times and gain one business day.

Once all the merchants who are customers of the bank have POS online machines instead of offline machines, there will be some acceleration of both the merchants' POS credits and their customers' debits. Additional revenue gains can be generated by extending the merchant cut-off time for POS online by two hours. This will move approximately 10% (equal to 2 hours divided by 24 hours in a day, assuming POS online transactions are relatively equally distributed across the day) of such credits and debits from one business day to the prior one.

Another possible technique for acceleration involves accelerating intra-bank processing within large banks. Many large banks have separate legal entities in each State, as well as separate processing centers in different regions. Processing of checks delivered in one region, but posted to an account domiciled in another, often takes an extra day. Converting a check to an electronic form can enable the customer's account to be debited one day earlier.

In some instances, debits can be accelerated without accelerating the credit, the obvious example being check processing. In other instances, debits can be accelerated by accelerating the whole deposit, as with POS debits. Both of these scenarios are beneficial. When a bank accelerates credits to accelerate debits, it is important to realize that the associated customer credit and debit are not in the same accounts, often not in the same account types, and usually not in the same bank. Most debit items will be to retail accounts, while most credit dollars will be to company accounts. More rarely, on pay days, is a commercial account debited to provide many credits to its employees' retail accounts.

In general, acceleration techniques can be categorized into several analytic possibilities, all of which will increase debit acceleration revenues gained in the bank. In the first case, debits inside the bank are accelerated, but only for the bank's deposits and without accelerating credits. Here customer balances are diminished, but no monies leave the bank. Processing of depositor's checks is one possible example. Where the depositing customer credit is in the same institution, the debit requires no movement of money outside the institution. The debit is accelerated while the availability of funds to the depositor remains the same. The bank thus gets all the revenue benefits of debit acceleration without any diminishment of monies in the bank.

A second case is when debits are accelerated also to other institutions, and so settlement back into the bank may be accelerated. In this case, there will also be more monies in the bank. Bankers have relatively sophisticated algorithms to determine the value of accelerating the collection and delivery of checks to other Banks to accelerate settlement back. What is missing from these algorithms is an appreciation that one business day's acceleration of certain check types drawn on their own bank can yield substantial incremental revenue.

In a third scenario, in order to accelerate debits, the bank accelerates its depositors' credits. This advances the availability of funds to the depositor but also the settlement of other institutions to the bank. Monies in the bank are likely not to be diminished. For example, consider that the use of check or debit cards at offline POS terminals is a retail consumer activity that is confined to non-interest retail checking accounts. Some of these accounts will be liable to ODRI fees and others liable to ODP fees. The only revenue streams to be affected are changes to ODRI, ODP and the monies in the bank. If the method of acceleration is to accelerate the processing of the bank's merchant customers with POS offline transactions, then credits, settlement to the bank of associated debits posted in other institutions, and the posting of associated debits in the bank to ODRI and ODP accounts will all be accelerated.

In those three possibilities, the bank under consideration was also the BoFD. The Payor Bank was also the Payee Bank. Other analytic possibilities exist where the bank under consideration, the Payor debit posting bank, is not the BoFD or Payee Bank. Fourth, if the debit from another institution is accelerated to generate additional revenues, customer balances will be diminished but, in most cases, settlement of monies out of the bank will be accelerated. Fifth, if the BoFD accelerates its own depositors' credits, then some of the Payor Bank's debits will tend to be accelerated with accelerated settlement back to the BoFD. These are the worst scenarios for the considered Payor bank and profitability must be considered.

If the BoFD accelerates its retail checks or merchants' POS debits to the Payor Bank by one day, the Payor Bank will gain ODRI and ODP revenue, but may need to settle one day earlier. A determination must occur whether the increased revenue per item outweighs the diminishment of monies in the Payor bank by accelerated settlement.

Suppose that the average retail check is $300. Suppose that 1% of such checks post to ODRI accounts in OD status and 3% of such checks post to ODP accounts making a drawdown. The incremental ODRI revenues of debit acceleration are given by:

$$0.5\% \times F3 \times N4 \quad (9)$$

If F3, the ODRI transaction fee, is $30, then incremental ODRI revenue is 15 cents per accelerated debit. The incremental ODP revenues are given by $$35\%*F2*N2+\$*I, \text{ and} \quad (4)$$

$$\$=50\%*35\%*A \quad (5)$$

Assuming a fee of $10 and 3 debits per account and an interest rate of 6%, ODP revenues are $35\%*\$10*0.01+50\%*35\%*\$900*0.01*6\%*1/251$, which is equal to:

3.5 cents+0.04 cents=3.54 cents per accelerated debit.

So all the incremental revenues for this debit type acceleration are equal to:

15 cents+3.54 cents=18.54 cents per accelerated debit.

An assessment must be made to determine whether increased revenues of, say, 18.54 cents an item due to increased revenues from debit acceleration, outweigh the loss to the Payor Bank of $300 per item for one business day. To make this assessment a bank must consider the value of monies to the Payor Bank. In March 2003, the overnight Federal Funds rate stood at 1.25% per annum (pa) and the cost of funds was approximately double that amount. A conservative approach can assume that the value of funds to the bank, created by various multiplier effects, is more and may increase as interest rates increase. If one assumes that the value of money to the Payor bank is 10% pa, then the value of a $300 item across one business day is:

$\$300.00 \times 10\% \times 1/251 = 12$ cents an item.

Thus, even when the Payor Bank must accelerate settlement of retail check monies out of the bank, the net value of debit acceleration is, in this example:

18.54 cents−12 cents=6.54 cents per accelerated debit.

And, using the same assumptions, the net profit of accelerating a $100 POS debit, even when settlement is also accelerated, would be:

18.5 cents−4 cents=14.5 cents per accelerated debit.

Thus, in many circumstances the increased revenue from acceleration can exceed the diminishment of funds in the bank. In such circumstances, acceleration is beneficial to both the Payor Bank with increased revenues from accelerated debit posting and to the Payee Bank of First Deposit with increased revenues from accelerated settlement monies into their bank. So mutual and reciprocal assistance between banks might be helpful.

And in other circumstances, the increased revenues of acceleration can be achieved without the diminishment of any monies in the Payor bank, because the debit acceleration does not affect settlement. This is the case either because there is no settlement or because the settlement date is unaffected by the posting date of the debit. For example, once settlement has occurred, say on Day 1, a lost or incoming returned item check can be advanced from Day 4 to Day 3. The invention is a flexible method and system to take advantage of these complicated circumstances in a controlled, orderly and measured way.

Different debit types will affect different account types and therefore different revenue streams. The different average amounts of debit types will affect the same revenue streams differently. The method or technique of acceleration will affect the monies in the bank. These can all be calculated to predict the revenue effect of the method of acceleration of a particular debit type.

In step 412, the revenue impact of accelerating the posting of debit transactions for the selected debit type is determined. A number of embodiments to the invention can be used to assess the revenue impact. The choice of embodiment to be used will be driven by factors such as the availability of actual customer data, the degree of precision desired in estimating the revenue impact, and the costs to generate the revenue impact. Three embodiments to estimate revenue impacts associated with accelerating debit transaction processing include: (1) using a system as described herein with reference to FIGS. 5A, 5B, and 6, (2) using a set of equations that model service fee and interest changes as described with respect to step 404 above, and (3) using customer reaction predictive factors along with simplified modeling equations as provided in several examples with respect to step 404.

Within this step 412, the number of items to be accelerated, the number of days that items will be accelerated and the value of the items to be accelerated must be determined, or estimated. This should be enabled by the process maps developed in step 408. The level of precision in determining these values will significantly impact the precision of the incremental revenue predictions.

Figure 5A:
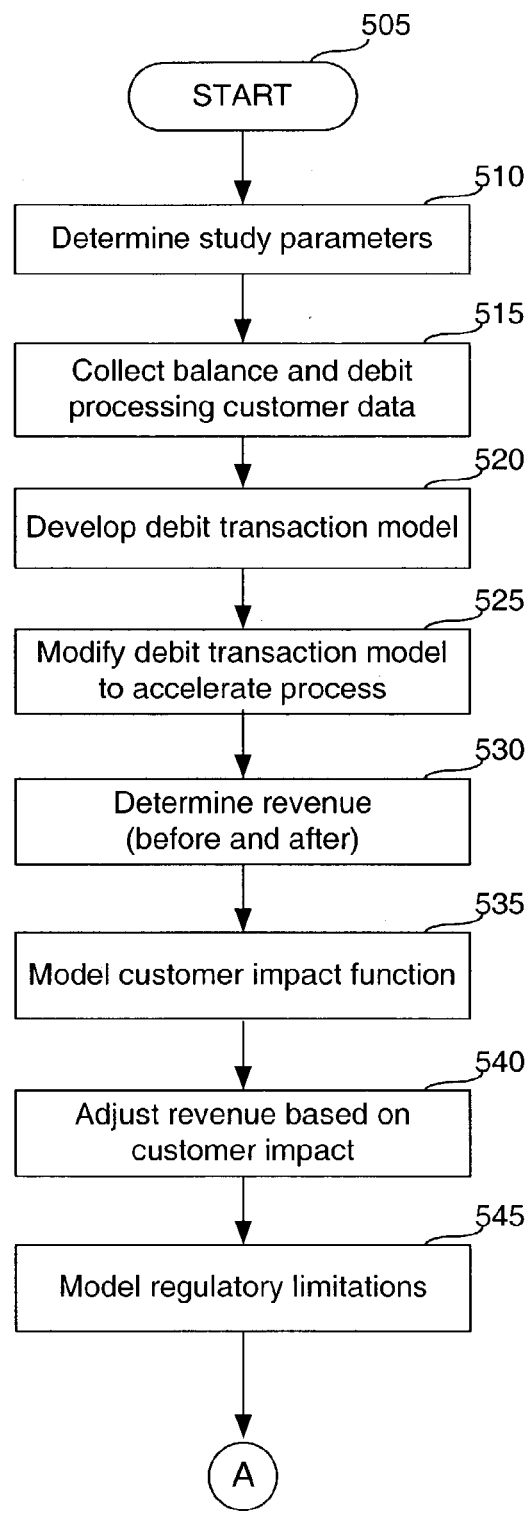
FIGS. 5A and 5B are flow charts of a method to determine the impacts of accelerating the processing of a type of debit transaction, according to an embodiment of the invention.
Figure 5B:
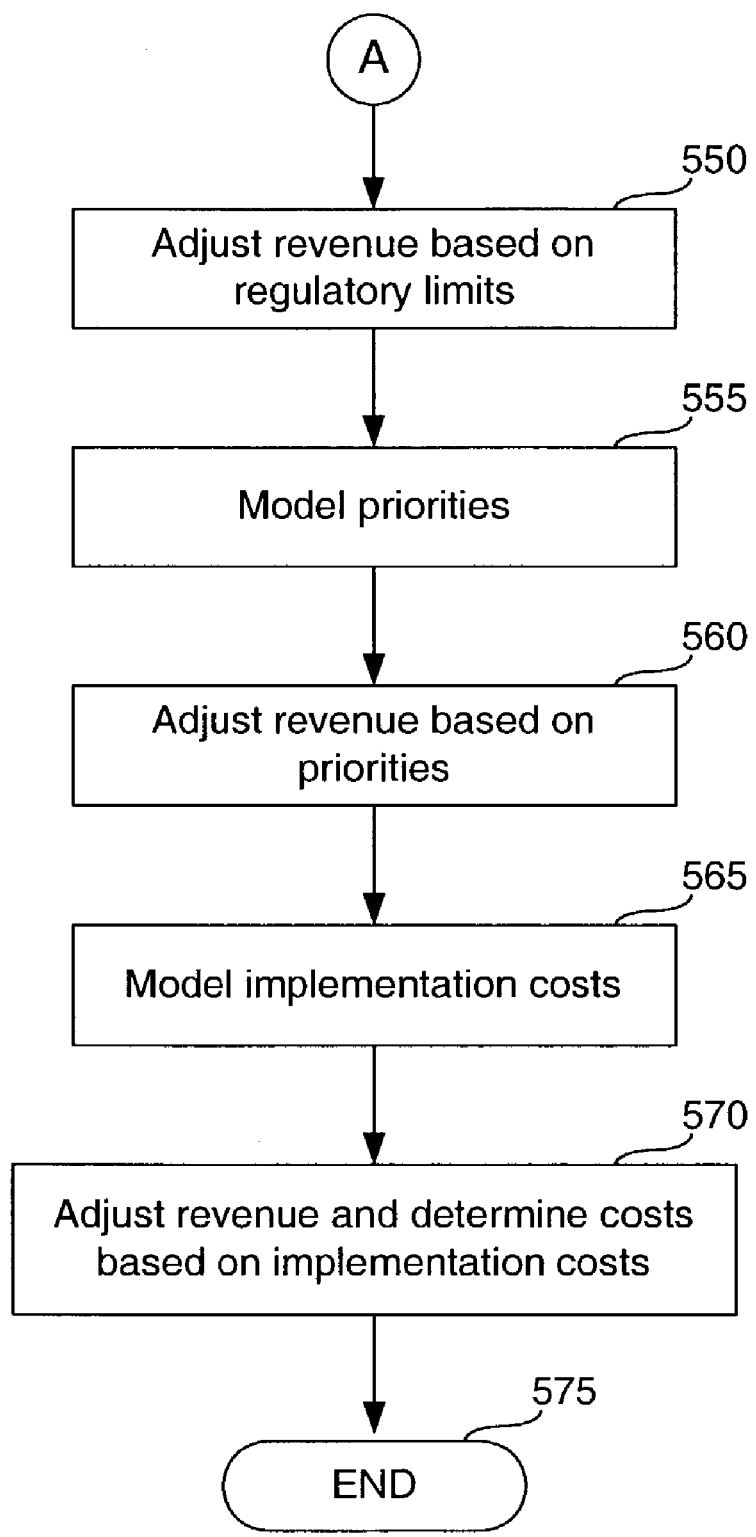
Figure 6:
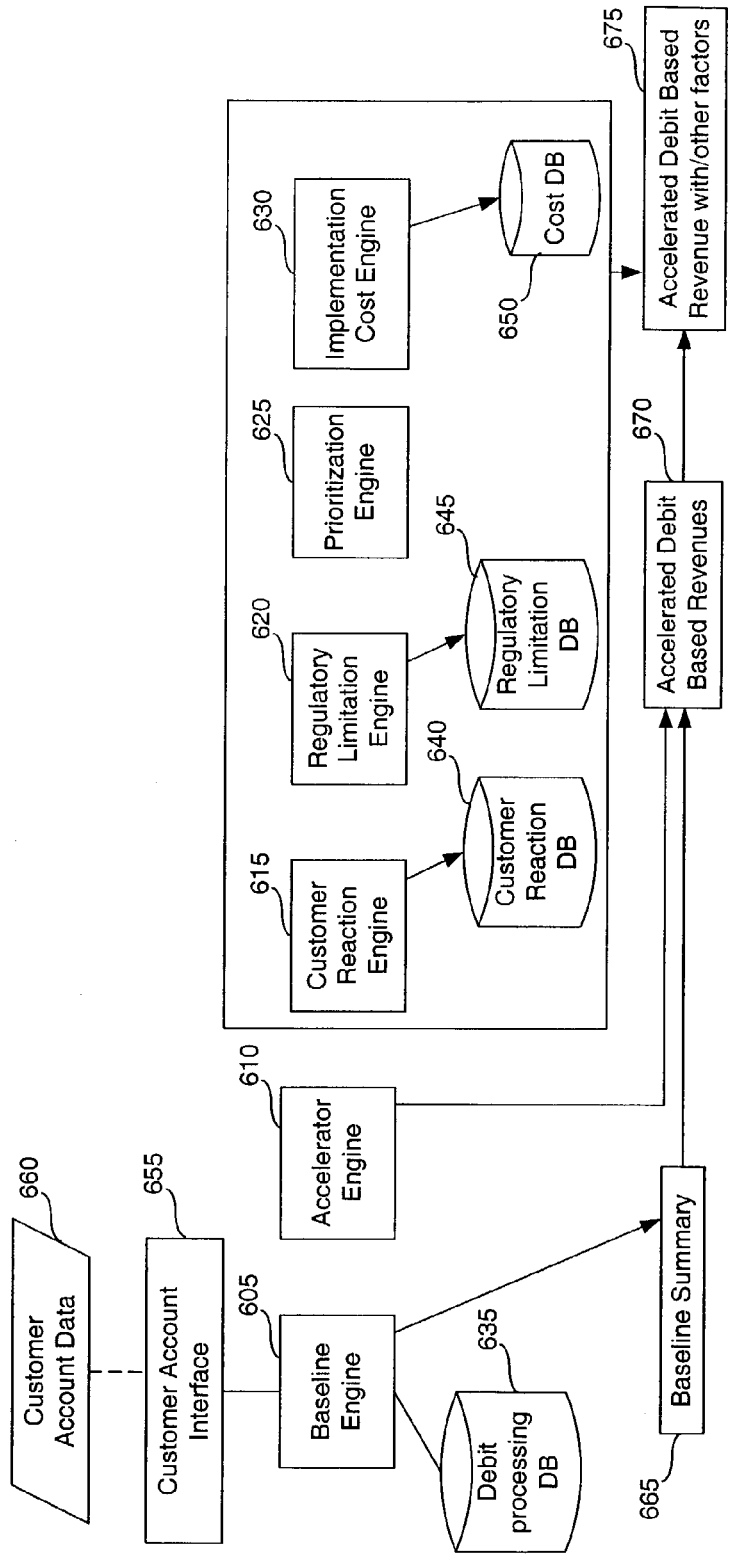
FIG. 6 is a diagram of a system to determine the impacts of accelerating the processing of one or more types of debit transactions, according to an embodiment of the invention.

In the first embodiment, a system such as described herein with reference to FIGS. 5A, 5B, and 6 can be used. The use of the system will provide relatively high precision results in that actual customer data is manipulated to model what a bank's incremental revenue would be if debit transaction processing were accelerated.

In the second embodiment, a set of equations like those discussed with respect to step 404, can be used to predict the potential revenue associated with accelerating the processing of a type of debit for a particular customer accounts type. Use of this embodiment is likely to result in revenue estimates that are not as precise as those generated through the use of the first embodiment, however, the costs to implement such an approach are likely to be significantly less.

In the third embodiment, which is similar to the second embodiment, a set of predictors can be used to determine the incremental revenue to a bank resulting from acceleration of debit transactions for a particular account type. Initially, customer behavior predictive factors can be based on existing banking behavior patterns. As more experience is gained in actually accelerating debit processing and monitoring customer reactions (e.g. do customers change their banking behavior to avoid bank revenue generating events driven by debit acceleration), customer behavior predictive factors can evolve to more accurately model customer behavior resulting from debit processing acceleration. Thus, in general the incremental revenue to a bank from increasing debit processing can be modeled as:

$$P*(\text{Fee Revenue}+\text{Interest Revenue}) \qquad (10)$$

Where, P is a customer behavior predictive factor based on the type of account.

Alternatively, given the likelihood that the incremental revenues generated from additional account fees will be orders of magnitude greater than the incremental interest revenues, equation (11) can be approximated by:

$$P*(\text{Fee Revenue}) \qquad (11)$$

In both equations (10) and (11), the fee revenue and interest revenue can be estimated using approaches similar to those used in the second embodiment discussed above.

In addition to these calculations the net effect of acceleration must take account of the extent to which the method of acceleration increases or diminishes the moneys in the bank, thereby affecting the bank's investable funds, the sale and purchase of Fed Funds and loan amounts. The analytic possibilities were discussed with respect to step 410 above. Algorithms to estimate revenue impacts associated with these affects will be known to individuals skilled in the relevant arts and will not be reproduced here.

In order to determine the impact of debit acceleration, the impact of all debits within a debit type to be accelerated must be determined for each account type that will be affected. The incremental revenue gains must then be summed across all customer account types being considered. Finally, the negative revenue impacts (e.g., net on funds lost), if any, must be determined and subtracted from the total incremental revenue gains.

There is one further revenue impact of debit acceleration that is not only beneficial to banks but also to the public, in that it diminishes fraud losses. Acceleration, especially of such debits as incoming returned items, can lead to the earlier detection of frauds in customer accounts. Such frauds are often perpetrated until the account is frozen; the earlier the account is frozen, the greater the fraud prevention and loss prevention.

In step 414, an acceleration technique is implemented to accelerate posting of debit transactions. The acceleration technique can be determined by assessing the most revenue enhancing approaches to achieve reduction to the processing intervals identified in step 410 through use of the mapping created in step 408. In step 416, method 400 ends.

Method 420, as depicted in the flowchart of FIG. 4B, provides one method to accelerate the processing of an account debit transaction, according to an embodiment of the present invention. Method 420 is a method to identify what day the posting bank currently determines to be Day 0, and to determine a way to accelerate processing such that processing can begin before Day 0, such as Day −1 through Day −N. N is the number of days between when the customer authorizes a debit from his account to when the bank actually begins processing the debit, which is currently defined as Day 0 by the bank. Referring again to FIG. 3, T5 represents Day 0 from the Customer Bank or Payor Bank perspective and T1 represents Day −N for the transaction. Depending on how long the merchant takes to provide the transaction record to the merchant's BoFD and how long the BoFD takes to process the transaction record, N could be several days. By accelerating processing such that these days are not lost, the debit can be posted to the customer's account sooner, leading to additional bank revenue.

Method 420 begins in step 422. In step 424, the debit type transaction processing is mapped, for example as discussed in FIG. 3. In step 426, Day 0 is determined from the map. In step 428, a new map is created where the processing begins prior to the original Day 0. Method 420 ends in step 430. As one example of the application of this model, consider the offline POS transaction in FIG. 3. In that case, in step 428 a processing map can be developed and implemented that moves the start of processing from T5 to T1, or perhaps T2. One solution would be to have the merchant use an online POS system as opposed to an offline POS system. What is important is not necessarily the acceleration method, but rather the result of acceleration to shift the processing, so that processing begins before what the bank considered Day 0.

Another acceleration technique to achieve acceleration of debit type transaction processing is back valuation of the posted debit amount. In this case, a bank may post a debit to a customer account on a given day, but back value the debit to the business date the customer authorized the debit. Once the debit is posted, the bank will re-generate the customer account balances to reflect a debit occurring on the date the customer authorized the debit. In doing so, the bank will assess any additional fees that may apply and adjust interest calculations. Regulations may control the allowable instances of back valuation, as may customer sentiment. Credit card receipts generated by offline mechanical sliding imprinters carry a payment authorization date, which could, in theory, be used as a back valuation date.

Another way to achieve acceleration of debit transaction processing can include converting one type of debit to another type. So, for example, a check might be converted to an ACH type transaction to accelerate processing. Yet, another way to achieve acceleration of debit transaction processing would be to adjust the cut-off times for processing a debit type. On each day, a bank has certain cut-off times that determine whether a transaction will be processed that business day or wait until the next business day. If these cut off times are moved later in the day, more transactions can be processed that same business day, rather than on the next business day. Such acceleration can lead to significant incremental revenue. These examples are illustrative, and not intended to be limiting. Individuals skilled in the relevant arts will be able to identify other ways to apply debit transaction acceleration techniques based on the teachings herein to achieve the revenue increases that are discussed.

The acceleration of debit transactions as discussed above has the potential to significantly enhance bank revenues. However, for a number of reasons, the process of accelerating debits raises many interrelated issues that are not well understood and quite complex. FIGS. 5A and 5B show a flowchart of a method 500 to evaluate these interrelated factors to assist in the evaluation of the potential revenue gains from accelerating debit type transactions, according to an embodiment of the present invention. The method describes an evaluation method to assess the revenue impacts associated with accelerating processing of one or more debit types. In addition, method 500 determines the impacts on revenues derived from accelerated debit transaction processing from such factors as customer reactions, regulatory limitations, prioritization, and implementation costs. The method describes how actual customer data can be examined to demonstrate to bank personnel the impacts on particular customer accounts.

Method 500 begins in step 505. In step 510, study parameters are selected. The study parameters can include, but are not limited to the types of accounts to be considered, the number of accounts to be examined and the time period for which account balance, credit and debit activity will be monitored. In step 515, balance and debit processing data are collected for a sampling of a bank's customers, based on the parameters selected in step 510. In step 520, debit transaction models are developed for the debit types to be included in the study. Debit transaction models are created from the debit type processing maps, as in FIG. 3. In step 525, debit processing is accelerated in at least one of the debit transaction models.

In step 530, the revenue generated to the bank associated from the acceleration is determined using the existing debit transaction models and the debit transaction models where processing has been accelerated. Using accounting models similar to those in FIGS. 1A–1D and FIGS. 2A–2D that factor in the accelerated debit transaction models, the effects on all revenue streams changed and on monies in the bank are calculated and summed. These results demonstrate to the bank the revenue impact associated with accelerating the processing of one or more debit transaction types.

In step 535, the customer impacts are modeled. Examples of the customer impacts that can be modeled include whether a customer will modify banking behavior in such a way that the impact of the debit acceleration will be nullified or reduced, and even whether the customer will close an account because of the acceleration of debit transactions. In step 540, the revenue projections generated in step 530 are adjusted to account for potential customer reaction impacts.

In step 545, regulatory limitations that can restrict the acceleration of debit processing are modeled. Examples of regulatory limitations that can be modeled include Federal Reserve Bank regulations and State laws. These regulatory limitations, which are often complex, include the opportunities for back valuation, the conversion of debit types, the movement of cut-off times, and the timing of settlement for different debit types. In step 550, the revenue projections generated in step 530 are adjusted to account for potential regulatory limitations. In addition, if both customer impacts and regulatory limitations are examined together the projections generated in step 540 can also be adjusted.

In step 555, a bank's priorities are modeled. One example of the priorities that can be modeled includes whether a bank wants to accelerate debit processing more for a particular category of customer accounts, for example, more for retail consumer customer accounts than for wholesale commercial accounts. In that case, the POS debit type would be more appropriate than the ACH debit type, as a target for potential acceleration. Another example priority that can be modeled is scheduling information for when different processes will be accelerated. In step 560, the revenue projections generated in step 530 are adjusted to account for the bank's priorities. In addition, the projections generated in step 540 and step 550 can also be adjusted.

Finally, in step 565 implementation costs are modeled. These include the costs associated with implementing a particular method to accelerate a debit type transaction process. For example, a bank may need to upgrade computer systems to enable it to process debit transactions in real time instead of waiting until after the normal business day cut-off time to do so. In step 570, costs are determined and the revenue projections generated in step 530 are adjusted to account for potential implementation cost limitations. In addition, the projections generated in step 540, 550 and 560 can also be adjusted.

As will be known by persons skilled in the relevant art, the customer impact, regulatory limitation, prioritization and cost limitation factors can be applied in any combination to generate different perspectives to assist a bank in evaluating the financial ramifications of accelerating the processing of debit transactions. Further, any other factors that may impact revenue could be considered in a similar fashion.

FIG. 6. is a block diagram representing system 600, according to an embodiment of the invention. System 600 is a system for implementing the method depicted in FIG. 5. System 600 includes baseline engine 605 and associated debit processing database 635; accelerator engine 610; customer reaction engine 615 and associated customer reaction database 640; regulatory limitation engine 620 and associated regulatory limitation database 645; prioritization engine 625; and implementation cost engine 630 and associated cost database 650. Engines 605, 610, 615, 620, 625, and 630 are used to generate revenue projections, analysis and the like.

System 600 also includes customer account interface 655. Customer account interface 655 gathers customer account information contained within customer account data 660 and organizes the data into a useable format for system 600. Customer account data 660 can include customer account types, records of transactions, account balance information, and the like for specific customer accounts.

Baseline engine 605 is used to calculate baseline summary 665 that provides actual revenues received from a sampling of customer accounts. Baseline engine 605 enables a user to select study parameters, such as types of accounts to be used, the method of selection for those accounts, the study period to be examined and other related variables. Baseline engine 605 also relies upon debit processing database 635 to provide generic transaction debit models to enable a user to efficiently model baseline debit transactions for a particular bank. Debit processing database 635 contains generic debit transaction models for the common transaction types (e.g., POS transactions, ATM transactions, etc.).

Baseline engine 605 prompts the user to identify the types of debit transactions to be analyzed. Baseline engine 605 also permits the user to input values for each of the timeline points for the debit transaction types that correspond to the particular bank's process. Alternatively, where the timeframes are unknown, default values can be used. Thus, rather than reinventing each process with each use, baseline models exist to make use of the system more efficient. Baseline engine 605 generates baseline summary 665. In one example, baseline summary 665 includes summary statistics on the sample customers (e.g., number of accounts, total balances, average balances), total revenue to the bank generated by the customer accounts, fee revenue generated to the bank, and summaries of the fees for each of the types of debits. Baseline summary 665 can also suggest debit transaction processes that the bank should consider accelerating.

Accelerator engine 610 enables the user to manipulate the debit transaction models to determine the impact on bank revenues. Accelerator engine 610 enables the user to accelerate the debit transaction models by adjusting the timeline values in a transaction model. Once a user has made adjustments to the debit transaction models, accelerator engine 610 generates output 670 which shows the impacts of accelerating the debit transaction processing.

Customer reaction engine 615 determines the potential customer reactions to acceleration of a particular type of debit transaction. In one embodiment, customer reaction engine 615 relies on customer reaction database 640 to provide customer reaction factors. For example, customer reaction database 640 can contain the probability that a customer will modify behavior such that the impact of accelerating a debit transaction will be nullified. Additionally, customer reaction database 640 can contain the probability that a customer will close an account if a debit transaction process is accelerated. Customer reaction engine 615 can use information directly from customer reaction database 640 or prompt a user to supply values for customer reaction factors. Customer reaction engine 615 individually or in combination with the engines 620, 625 and/or 630, then applies the customer reaction factors to output 670 to produce output 675 that demonstrates the impacts on projected revenue of potential customer reactions.

Regulatory limitation engine 620 determines the impact of banking regulations, laws and custom on the acceleration of a particular debit transaction. Regulatory limitation engine 620 relies upon regulatory limitation database 645 to provide data on regulatory limitations that may impact acceleration of a particular transaction type. Regulatory engine 620 applies the regulatory limitation factors to output 670 to demonstrate the impacts on projected revenue of potential regulatory limitations. A summary of the regulatory limitations applied can also be presented. Regulatory limitation engine 620 individually or in combination with the engines 615, 625 and/or 630, then applies the regulatory limitation factors to output 670 to produce output 675 that demonstrates the impacts on projected revenue of regulatory limitations.

Prioritization engine 625 determines the impact of the bank's scheduling priorities for implementing changes to revenue projections generated by the other engines. Prioritization engine 625 can include functions that permit a user to implement acceleration changes to a certain subset of debit types (e.g., only POS offline debit transactions) or a subset of accounts (e.g., only retail accounts) and also to provide schedules for when the changes would be implemented. Priority engine 625 individually or in combination with the engines 615, 620 and/or 630, then applies the prioritization factors to output 670 to produce output 675 that demonstrates the impacts on projected revenue of the prioritization factors.

Implementation cost engine 630 determines whether the cost of implementing a particular change to a debit transaction process may be cost prohibitive and also generates cost information for implementing a particular change. Implementation cost engine 630 relies on cost database 650 to supply basic cost information for typical ways to accelerate transaction processing. In addition to relying on this information, implementation cost engine 630 enables a user to provide cost information. Implementation cost engine 630 applies the cost limitation factors to output 670 and the outputs generated by other engines to demonstrate the impacts on projected revenue of cost limitations. Additionally, cost engine 630 will generate a summary of projected costs to implement means to accelerate debit transaction processing. Implementation engine 630 individually or in combination with the engines 615, 620 and/or 625, then applies the implementation cost factors to output 670 to produce output 675 that demonstrates the impacts on projected revenue of the implementation cost factors.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method for increasing revenue of a financial institution through acceleration of debit transaction posting to customer accounts, wherein acceleration is relative to credit activity in the same customer accounts, comprising:
   (a) selecting a customer account type that will yield increased revenue to the financial institution when debit transaction posting is accelerated;
   (b) selecting a debit type, wherein if the posting of debit transactions within the debit type to a customer account within the customer account type identified in step (a) is accelerated, customer account balances within the customer account type will be less for a period of time than if posting of the debit type had not been accelerated;
   (c) identifying opportunities to accelerate posting of debit transactions within the debit type; and
   (d) determining the revenue impact to the financial institution of accelerating the posting of debit transactions within the debit type to customer accounts within the customer account type.

2. The method of claim 1, further comprising;
   (e) implementing an acceleration technique to accelerate the posting of debit transactions in the debit type.

3. The method of claim 1, further comprising;
   (e) repeating steps (b) through (d) for all debit types of the financial institution.

4. The method of claim 3, further comprising;
   (f) repeating steps (a) through (e) for all customer account types of the financial institution.

5. The method of claim 1, wherein step (c) further comprises;
   (i) mapping the processing of the debit type; and
   (ii) identifying processing intervals that can be reduced.

6. The method of claim 2, wherein said customer account type is an interest expense account.

7. The method of claim 6, wherein said interest expense account is a savings account.

8. The method of claim 6, wherein said interest expense account is a time deposit account.

9. The method of claim 2, wherein said customer account type is an interest revenue account.

10. The method of claim 9, wherein said interest revenue account is a credit card account.

11. The method of claim 9, wherein said interest revenue account is a line of credit account.

12. The method of claim 2, wherein said customer account type is a fee bearing account.

13. The method of claim 12, wherein said fee bearing account is an overdraft protection account.

14. The method of claim 12, wherein said fee bearing account is an overdraft fee account.

15. The method of claim 2, wherein said debit type is a customer-initiated debit type.

16. The method of claim 15, wherein said customer-initiated debit type is a point of sale offline debit.

17. The method of claim 15, wherein said customer-initiated debit type is a point of sale online debit.

18. The method of claim 15, wherein said customer-initiated debit type is an automated clearing house (ACH) debit.

19. The method of claim 15, wherein said customer-initiated debit type is a paper check.

20. The method of claim 15, wherein said customer-initiated debit type is a wire transfer debit.

21. The method of claim 15, wherein said customer-initiated debit type is a customer-initiated automatic electronic debit.

22. The method of claim 15, wherein said customer-initiated debit type is an Internet debit.

23. The method of claim 15, wherein said customer-initiated debit type is an ATM transaction debit.

24. The method of claim 2, wherein said debit type is a bank-initiated debit.

25. The method of claim 24, wherein said bank-initiated debit type is an overdraft fee debit.

26. The method of claim 24, wherein said bank-initiated debit type is an overdraft protection fee debit.

27. The method of claim 24, wherein said bank-initiated debit type is a returned item fee debit.

28. The method of claim 24, wherein said bank-initiated debit type is an incoming returned item debit.

29. The method of claim 1, wherein when the customer account type is a commercial account subject to overdraft account maintenance fees, step (d) further comprises:
   (i) determining the number of accounts driven into an overdraft position as a result of debit acceleration;
   (ii) determining the dollar value of a daily account fee imposed on an account for being in an overdraft position;
   (iii) determining the total dollar amount of debits accelerated for accounts that were driven into an overdraft position as a result of debit acceleration;
   (iv) determining the average number of calendar days that accounts are in an overdraft position;
   (v) determining an interest rate for one calendar day; and
   (vi) determining the incremental revenue by adding the product of the values determined in steps (i) and (ii) to the product of the values determined in steps (iii), (iv), and (v), and 0.50.

30. The method of claim 1, wherein when the customer account type is an overdraft return item account, step (d) further comprises:
   (i) determining the overdraft account maintenance fee charged with a customer overdraws an overdraft return item account;
   (ii) determining the number of accelerated debits to overdraft return item accounts that are in an overdraft position; and
   (iii) determining the incremental revenue by multiplying the values determined in steps (i) and (ii) and 0.50.

31. The method of claim 1, wherein when the customer account type is an overdraft protection account, step (d) further comprises:
   (i) determining the overdraft protection account maintenance fee charged to an account when the overdraft protection feature is applied;
   (ii) determining the number of overdraft protection accounts which exercise the overdraft protection feature, which contain the debit type to be accelerated;
   (iii) determining the incremental amount of monies drawn down because of acceleration;

(iv) determining an interest rate of a linked account to the overdraft protection account; and (v) determining the incremental revenue by adding the product of the values determined in steps (i) and (ii) and 0.35 to the product of the values determined in steps (iii) and (iv).

32. The method of claim 1, wherein when the customer account type is an overdraft protection account, step (d) further comprises:

(i) determining incremental revenue generated from bank-initiated account maintenance fees;

(ii) determining incremental revenue generated from interest revenue resulting from accelerating debits;

(iii) determining a customer behavior predictive factor; and (iv) multiplying the sum of the incremental revenues determined in steps (i) and (ii) by the customer behavior predictive factor.

33. The method of claim 1, wherein when the customer account type is an overdraft fee account, step (d) further comprises:

(i) determining incremental revenue generated from bank-initiated account maintenance fees;

(ii) determining a customer behavior predictive factor; and (iii) multiplying the incremental revenue determined in steps (i) by the customer behavior predictive factor.

34. The method of claim 2, wherein the acceleration technique further comprises:

(i) identifying what constitutes Day 0 of the processing of a debit transaction within the debit type, wherein Day 0 is a day when the financial institution determines that a debit has begun processing at the financial institution; and (ii) creating a new method for processing the debit transaction, wherein processing of the debit transaction begins prior to said Day 0.

35. The method of claim 2, wherein the acceleration technique further comprises back valuation of debit transactions within the debit type.

36. The method of claim 2, wherein the acceleration technique further comprises converting the debit type to an alternative debit type.

37. The method of claim 2, wherein the acceleration technique further comprises delaying cut-off times of the financial institution for processing debit transactions of the debit type.

38. A method for increasing financial institution revenue, comprising:

(a) identifying opportunities to accelerate the posting of debit transactions within a debit type;

(b) accelerating the posting of debit transactions for the debit type to increase financial institution revenue;

(c) selecting a debit type, wherein if the posting of debit transactions within the debit type to a customer account within the customer account type identified in step (a) is accelerated, customer account balances within the customer account type will be less for a period of time than if posting of the debit type had not been accelerated; and (d) determining the revenue impact to the financial institution of accelerating the posting of debit transactions within the debit type to customer accounts within the customer account type.

39. The method of claim 38, wherein said account debit type is a customer-initiated debit type.

40. The method of claim 39, wherein customer-initiated debit type is an automated clearing house (ACH) debit.

41. The method of claim 39, wherein customer-initiated debit type is a paper check.

42. The method of claim 38, wherein said account debit type is a bank-initiated debit type.

43. The method of claim 42, wherein said bank-initiated debit type is an overdraft fee debit.

44. The method of claim 42, wherein said bank-initiated debit type is an overdraft protection fee debit.

45. The method of claim 42, wherein said bank-initiated debit type is an incoming returned item debit.

46. A method to determine the revenue impacts to a financial institution of accelerating the posting of at least one debit type, comprising:

(a) determining a set of study parameters that include at least the types of customer accounts, the number of customer accounts, and the duration of account activity to study;

(b) collecting balance and debit processing data from a sample of customer accounts selected based on said study parameters;

(c) developing at least one debit transaction model of the processing of at least one debit type;

(d) modeling the impacts of modifying said at least one debit transaction model by accelerating the rate at which the debit would post to a customer account; and (e) determining revenue flows to the financial institution based on said impacts.

47. The method of claim 46, further comprising:

(f) modeling an impact of customer reaction to acceleration of debit processing; and (g) determining adjustments to the revenue flows determined in step (e) based on modeled customer reactions.

48. The method of claim 46, further comprising:

(f) modeling an impact of regulatory limitations on a financial institution's ability to accelerate debit processing; and (g) determining adjustments to the revenue flows determined in step (e) based on modeled regulatory limitations.

49. The method of claim 46, further comprising:

(f) modeling an impact of prioritizing the implementation of changes to accelerate the processing of debits by the financial institution; and (g) determining adjustments to the revenue flows determined in step (e) based on the modeled impact of prioritizing the implementation of changes to accelerate the processing of debits.

50. The method of claim 46, further comprising:

(f) modeling the implementation costs associated with accelerating at least one debit transaction method; and (g) determining adjustments to the revenue flows determined in step (e) based on the modeled implementation costs.

51. A system for evaluation of financial institution debit processing acceleration, comprising:

(a) memory means for storing a set of models, each model defining a method by which a financial institution processes a debit type;

(b) means for gathering balance and debit transaction data from a set of financial institution customer accounts;

(c) means for modifying the set of debit type processing models to accelerate the processing of debits; and (d) means for determining the impact to revenues of the financial institution resulting from application of models modified in step (c) to the balance and debit transaction data gathered in step (b).

52. The system of claim 51, further comprising:

(e) memory means for storing a set of customer reaction functions, each customer reaction function defining the probability that a customer will change their banking characteristics to nullify the impact of accelerating a debit processing method and the probability that a customer will close the customer's account as a result of the financial institution accelerating a debit processing method; and (f) means for determining the impact to revenues of the financial institution resulting from application of the set of customer reaction functions to the impact determined in step (d).

53. The system of claim 51, further comprising:

(e) memory means for storing a set of regulatory impact functions, each regulatory impact function defining regulatory limitations that restrict acceleration of a type of account debit; and (f) means for determining the impact to revenues of the financial institution resulting from application of the set of regulatory impact functions to the impact determined in step (d).

54. The system of claim 51, further comprising:

(e) means to gather priority and schedule information for implementing changes to the processing of at least one debit type; and (f) means for determining the impact to revenues of the financial institution resulting from application of the priority and schedule information to the impact determined in step (d).

55. The system of claim 51, further comprising:

(e) means to gather cost information for implementing changes to processing of at least one debit type; and (f) means for determining the impact to revenues and expenses of the financial institution resulting from application of cost information to the impact determined in step (d).

* * * * *